United States Patent
Neuert

(10) Patent No.: US 10,812,951 B2
(45) Date of Patent: Oct. 20, 2020

(54) INTEGRATION AND DISPLAY OF MULTIPLE INTERNET OF THINGS DATA STREAMS

(71) Applicant: SAP SE, Walldorf (DE)

(72) Inventor: Holger Neuert, Wiesenbach (DE)

(73) Assignee: SAP SE, Walldorf (DE)

( * ) Notice: Subject to any disclaimer, the term of this patent is extended or adjusted under 35 U.S.C. 154(b) by 49 days.

(21) Appl. No.: 16/046,860

(22) Filed: Jul. 26, 2018

(65) Prior Publication Data

US 2020/0037125 A1   Jan. 30, 2020

(51) Int. Cl.
| | |
|---|---|
| *H04W 4/38* | (2018.01) |
| *H04W 4/021* | (2018.01) |
| *G01C 21/36* | (2006.01) |
| *H04W 4/02* | (2018.01) |
| *G08G 1/00* | (2006.01) |

(52) U.S. Cl.
CPC .......... *H04W 4/38* (2018.02); *G01C 21/3691* (2013.01); *G08G 1/00* (2013.01); *H04W 4/02* (2013.01); *H04W 4/021* (2013.01)

(58) Field of Classification Search
CPC ......... H04W 4/38; H04W 4/021; H04W 4/02; G01C 21/3691; G08G 1/00
See application file for complete search history.

(56) References Cited

U.S. PATENT DOCUMENTS

| | | | | |
|---|---|---|---|---|
| 7,941,819 | B2* | 5/2011 | Stark | G11B 27/034 |
| | | | | 725/45 |
| 10,158,536 | B2* | 12/2018 | Kim | H04L 41/0853 |
| 10,516,589 | B2* | 12/2019 | Innes | G06F 11/30 |
| 2017/0105095 | A1* | 4/2017 | Um | H04W 4/80 |
| 2018/0077449 | A1* | 3/2018 | Herz | H04N 21/422 |
| 2018/0203744 | A1* | 7/2018 | Wiesmaier | G06F 16/24568 |
| 2018/0373399 | A1* | 12/2018 | Battula | G06F 3/0482 |
| 2019/0102203 | A1* | 4/2019 | Wang | G06F 40/40 |
| 2019/0271566 | A1* | 9/2019 | Childers | H04Q 9/00 |
| 2020/0065123 | A1* | 2/2020 | Yang | G06F 9/455 |

* cited by examiner

*Primary Examiner* — Omar J Ghowrwal
(74) *Attorney, Agent, or Firm* — Klarquist Sparkman, LLP

(57) ABSTRACT

Techniques and solutions are described for processing and displaying information received from a plurality of remote computing devices, such as internet of things (IOT) devices. Data from the IOT devices, including from sensors associated with the IOT devices, can be received and processed by a monitoring component. The monitoring component can include a plurality of schedule data objects, which can be associated with categories. Data received from the IOT devices can be associated with a category, including by associating the data with one of more of the schedule data objects. The schedule data objects can be used to determine information that will be rendered for display to a user. The schedule data objects can also be used to generate alerts or notifications, or to automatically taken actions based on triggers or conditions associated with a respective schedule data object.

20 Claims, 14 Drawing Sheets

INTEGRATION AND DISPLAY OF MULTIPLE INTERNET OF THINGS DATA STREAMS

FIELD

The present disclosure generally relates to processing data from multiple data sources. Particular implementations relate to the management of multiple internet of things data streams, and user interfaces to facilitate interacting with such data streams.

BACKGROUND

Ever increasing amounts of data are becoming available, including through the integration of network connectivity into an ever-increasing variety of items. As increasing amounts of data become available, efficiently processing such data, both by computing devices and their users, can be challenging. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for processing and displaying information received from a plurality of remote computing devices, such as internet of things (IOT) devices. Data from the IOT devices, including from sensors associated with the IOT devices, can be received and processed by a monitoring component. The monitoring component can include a plurality of schedule data objects, which can be associated with categories. Data received from the IOT devices can be associated with a category, including by associating the data with one of more of the schedule data objects. The schedule data objects can be used to determine information that will be rendered for display to a user. The schedule data objects can also be used to generate alerts or notifications, or to automatically take actions based on triggers or conditions associated with a respective schedule data object.

In one embodiment, a disclosed method includes operations that can be carried out to render a display that includes information associated with a plurality of internet of things (IOT) devices. First sensor data from a first sensor is received. The first sensor is associated with a first IOT device. At least second sensor data from at least a second sensor is received. The at least a second sensor is associated with at least a second IOT device.

The first sensor data is associated with a first category. The at least second sensor data is associated with a second category. At least a first schedule data object associated with the first category is retrieved. At least a second schedule data object associated with the second category is retrieved. At least a first activity of the at least a first schedule data object is determined. The at least a first activity includes at least a first condition defined at least in part with respect to at least one of the at least a first sensor and the at least a second sensor.

A status associated with the first condition is determined. A display is rendered. Rendering the display can include determining a first current time and determining a time period associated with the at least a first schedule data object. The rendering can also include determining that the time period is associated with the first current time. Selectable icons associated with the first and second categories are rendered. An indication of the status of the at least a first condition is rendered for display.

In another aspect, operations are provided that can be carried out by a computing system that implements a data aggregation and visualization service for data received from a plurality of hardware sensors. First data from at least a first hardware sensor is received, the at least a first hardware sensor is associated with a first remote computing device, such as an internet of things (IOT) device. Second data from at least at least a second hardware sensor is received, the at least a second sensor associated with a second remote computing device, such as an IOT device. Third data from at least a third remote computing device is received. The third remote computing device can be the first remote computing device, the second remote computing device, or another remote computing device. Data received from the at least a third remote computing device includes an indication of an alert, a notification, or an error condition.

The first data is associated with a first activity category. The second data is associated with a second activity category. The third data is associated with a third activity category, where the third activity category can be the first activity category, the second activity category, or another activity category. First information content to be rendered for display is determined, the first information content being for the first data and the first activity category. Second information content to be rendered for display is determined, the second information content being for the second data and the second activity category. Third information content to be rendered for display is determined, the third information content being for the third data and the third activity category.

A display is rendered. Rendering the display can include rendering the first information content, the second information content, and the third information content.

In a further embodiment, a method is provided for rendering an aggregated display of information associated with a plurality of internet of things (IOT) devices. A map is rendered for display on a first display screen. Map icons representing a plurality of places or objects of interest are rendered for display on the map. The plurality of places and objects of interest are associated with at least one category of a plurality of activity categories.

A plurality of status identifiers for a plurality of the icons are rendered, proximate respective icons. A plurality of activity alerts are rendered on the first display screen. The plurality of activity alerts are associated with multiple activity categories of the plurality of activity categories. A plurality of activity icons are rendered for display, each activity icon representing a particular activity category.

User input is received selecting an activity icon of the plurality of activity icons. A second display comprising an activity detail screen is rendered for display. The activity detail screen displays information retrieved from at least one hardware sensor of at least one IOT device of the plurality of IOT devices or information determined based at least in part on the information received from the at least one hardware sensor.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Ever increasing amounts of data are becoming available, including through the integration of network connectivity into an ever-increasing variety of items. As increasing amounts of data become available, efficiently processing such data, both by computing devices and their users, can be challenging. Accordingly, room for improvement exists.

As an example, amusement parks contain a wide variety of network enabled devices, or have physical items which can be network-enabled, or which can otherwise provide data that can be made available over a network. However, in many cases, the data is not being used at all, or is not being used for as many purposes as it might. For instance, turnstiles, such as at an entry point to the park or to a particular ride in the park, may collect data regarding how many people have entered the park, how many people have been admitted to a ride (and therefore, perhaps, indicating that the ride has currently reached capacity and that additional patrons should not be admitted until additional capacity is available). However, if this data were made conveniently available, and with an efficient user interface, the data could be used for other purposes which could improve park operation, including initiating automated actions that could be taken.

Although the present disclosure proceeds in many cases using an amusement park as an example of how disclosed technologies can be applied to provide technical and other benefits, it should be appreciated that the disclosed technologies can be applied in other scenarios. Similarly, although the present disclosure can provide operational benefits for an enterprise, the present disclosure is directed to the technical issues of (1) processing of internet of things data; (2) providing improved human-computer interaction paradigms for interacting with data, including from disparate sources; and (3) task automation based on data received from hardware sensors.

In some aspects, data from various categories of internet of things devices is made available to a common computing component. The computing component can compare the information received with a set of rules. The set of rules can define what and how information should be presented to a user, actions that should be automatically taken, or a combination thereof. The rules can be dynamic, such as changing based on one or more defined time intervals. That is, the information that may be relevant to a task or user may change throughout the day. Similarly, a user interface can dynamically adapt, including adapting based on a current time and a time interval, to display appropriate information to a user, or take appropriate actions.

Example 2—Example Architecture

Figure 1:
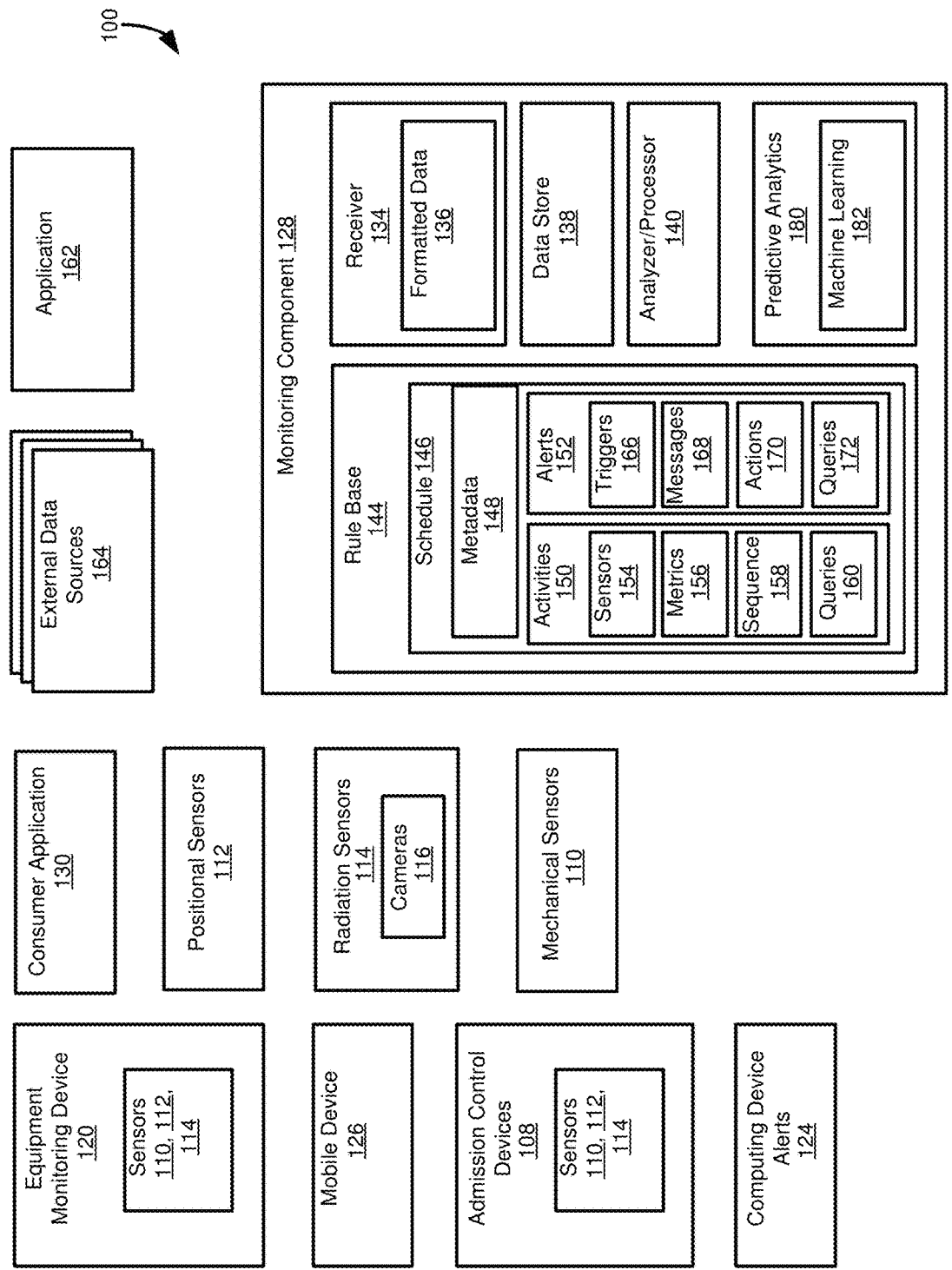
FIG. 1 is an example computing environment that includes a plurality of internet of things devices and a monitoring component in which disclosed technologies can be implemented.

FIG. 1 is a block diagram illustrating an example computing environment 100 in which disclosed technologies can be implemented. The computing environment 100 includes a plurality of network-enabled devices, at least a portion of which can represent "internet of things" devices. Although "internet of things" devices can refer to devices having a variety of characteristics, in at least some cases, internet of things devices can refer to devices having embedded computing systems, having special-purpose hardware or software (e.g., as opposed to being a general-purpose computing device), or a device not traditionally associated with computing or network connectivity.

As an example, refrigerators have existed for quite some time, and generally had no, or very limited computing capabilities (e.g., controlling lights and cooling components, providing a display, receiving user input), which capabilities would typically not be understood to include network connectivity. However, refrigerators are now being produced with embedded computing devices that include network connectivity, such as using WI-FI, BLUETOOTH, ZIGBEE, Z WAVE, cellular networks, near field communication, SIGFOX, NEUL, or LORAWAN. Adding network connectivity, and potentially additional computing power or functionality (albeit still typically limited compared with more general purposing computing devices such as personal computers, tablets, and smartphones), can transform the refrigerator into an IOT device.

Internet of things devices, or devices otherwise useful in aspects of the present disclosure, typically include one or more hardware sensors. That is, internet of things devices can detect information regarding their surroundings or use and communicate that information over a network. One type of IOT device that is relevant to the present disclosure is admission control devices 108. Admission control devices 108 can determine the number of individuals or objects that have been admitted into an area. For example, using the amusement park example, admission control devices 108 can include turnstiles, such as turnstiles that are installed at the entrance to the park, at attractions, or at other locations (e.g., shows, shops, bathrooms, etc.) within the park.

The admission control devices 108 can operate on various principles/have various types of sensors. Admission control devices 108 can include mechanical sensors or actuators 110, such as devices that generate a signal when the turnstile moves by a certain amount, such as an amount that admits an individual into an area restricted via the turnstile.

The admission control devices 108 can employ positional sensors 112, which can be used to determine the relative or absolute position of an object. Positional sensors 112 can include those typically included in an inertial measurement unit (IMU), including accelerometers, gyroscopes, magnetometers, and combinations thereof. For instance, an admission control device 108, such as a gate, door, or turnstile, can be equipped with one or more accelerometers, where a set degree or range of motion indicates that the admission control device has been activated and an admission event has occurred. Positional sensors 112 can also include sensors that determine a geospatial location of an object, such as using a global navigation satellite system (GNSS, e.g., the Global Positioning System, or GPS). Geospatial position can be determined by other types of positional sensors 112, such as wireless transceivers. That is, a receiver component can use techniques such as triangulation, and measurements of signal strength, in order to determine a position.

Admission control devices 108 can also incorporate various radiation sensors 114, such as to sense when an individual or item has passed proximate the sensor, such as into an area that is controlled or monitored by the admission control devices. Suitable radiation sensors include infrared and visible light sensors, as well as ultrasonic sensors. Radiation sensors can include cameras 116, such as a still camera or a video camera.

Another type of IOT device that can be used with the present disclosure is one or more equipment monitoring devices 120. Equipment monitoring devices 120 can incorporate one or more of mechanical sensors 110, positional sensors 112, radiation sensors 114, or other types of sensors. Whereas the admission control devices 108 use sensors to monitor external activities or conditions, the equipment monitoring devices 120 are used to monitor the status of a device or system on which the device is installed. Equipment monitoring devices 120 can be used to determine, for example, how many time the device, or a component thereof, has been activated. This information can be used to determine an operational or maintenance condition of the device, such as if the device is due for scheduled or preventative maintenance.

Parameters such as operating temperatures and pressures can be monitored using an equipment monitoring device 120, which can be used to determine if the device is operating within normal parameters, may be in need of repair, whether operating conditions need to be adjusted, or whether preventative or scheduled maintenance should be performed. An abnormally high temperature associated with the device may indicate that a particular component, or the device itself, is ready to fail and should be replaced. In addition to potentially reducing repair or replacement costs (e.g., because a device may be easier to maintain prior to failure), receiving information from equipment monitoring devices 120 can reduce equipment downtime and can reduce health and safety concerns.

Although admission control devices 108 and equipment monitoring devices 120 are shown in FIG. 1, it should be appreciated that other types of devices can be included in a particular use scenario, and that one or both of the admission control devices and equipment monitoring devices can be omitted. Similarly, a particular monitoring device may include more, fewer, or different sensors than shown in FIG. 1.

The environment 100 can include one or more computing device alerts 124. Computing device alerts 124 can be received from general purpose or special purpose computing devices, including from embedded computing devices. Computing device alerts 124 can be received from, for example, personal computers, workstations, mobile devices 126, point of sale terminals, as well as devices on which equipment monitoring devices 120 are installed or other types of equipment (including IOT devices). For example, continuing with the example of an amusement park, computing devices alerts 124 might be received from point of sale terminals in stores or restaurants, computers involved in operating rides or shows, or from business functions such as human resources, payroll, accounting, etc.

Computer device alerts 124 can be sent in response to a variety of conditions. For example, if a computing system experiences an error condition (e.g., a code error or program crash), an error report or message can be sent, such as to a monitoring component 128. Similarly, an error report or message can be sent in the event of a network outage, storage failure or inaccessibility, etc. Computer device alerts 124 can also include reports, alerts, messages, etc. that are generated during normal operation of programs running on a computing device. For example, in the amusement park scenario, if an accounting or staffing issue is identified (e.g., too many employees fail to report to work), an alert can be generated and sent to the monitoring component 128. Software running on the computing devices can include rules that define when alerts should be sent.

The monitoring component 128 can receive information from one or more mobile devices 126, such as tablets and smartphones (but also including other types of portable computing devices, such as laptop computers, netbooks, personal digital assistants, wearable technologies, etc.). The mobile devices 126 represent users, which can be internal or external users that are interacting with the monitoring component 128, or a system that interacts with the monitoring component. For example, the mobile devices 126 can interact with a consumer application 130.

The consumer application 130 can provide functionality that is directed to external end users. In the amusement park scenario, the consumer application 130 can be an "app" that is accessible to consumers and which can provide the ability to get information about the amusement park (e.g., ride and show times, attraction locations, weather, information about food and beverage options, current traffic or parking conditions, etc.). The consumer application 130 can also include a loyalty program component, such that end users can be associated with unique accounts, and may be assigned a status (e.g., "elite") that may entitle them to rewards or privileges.

The monitoring component 128 can generally serve to receive, monitor, and act upon data received from other data sources, such as the admission control devices 108, the equipment monitoring devices 120, the computing device alerts 124, the mobile devices 126, the consumer application 130, or a combination thereof. The monitoring component 128 can include a receiver component 134. The receiver component 134 can serve to be an initial entry point for data received from the data sources (108, 120, 124, 126, 130). The receiver component 134 can format the data to provide formatted data 136.

Formatting the data can include storing the data in a data store, such as a data store 138. The data store 138 can be, for example, a table of a relational database system. Formatting the data can also include activities such as assigning data to variables (e.g., in memory variables), converting data to different formats, or mapping data to particular code or other representation. In some cases, variables to which data is assigned can be data members of an instance of a complex or abstract data type. An instance of an abstract or composite data type can be created when new data is received by the receiver component 134 and such new data can be assigned to data members of the data type instance.

The formatted data 136, or data otherwise received from the receiver component 134, can be analyzed by an analyzer or processor component 140. The analyzer component 140 can analyze, or caused to be analyzed, particular data messages that have been received by the monitoring component 128. For example, the analyzer component 140 can be used to determine whether any action needs to be taken in response to such data messages, or whether or how information related to such data messages should be displayed or otherwise processed.

In carrying out the analysis, the analyzer component 140 can call or access a rule base 144. The rule base 144 can include activities 150 and alerts 152. In particular cases, the activities 150 and the alerts 152 can be associated with a schedule 146, which may be maintained in the form of one or more schedule data objects. For example, a particular schedule item may be stored in an instance of an abstract or composite data type that includes data members of, or providing, the activities 150 and the alerts 152 (which can also be referred to as a notification or a message, and which can be used to indicate an error condition). Or, the schedule data objects can be maintained in the form of stored data, such as data stored in one or more relational database tables. The schedule data objects, when in the form of abstract or composite data types, can be mapped to underlying database tables, such as using object relational mapping. Schedule data objects can be stored, in at least some cases, in the data store 138. In other cases, the schedule data objects can be stored in another location.

Schedule data objects of the schedule 146 can be associated with metadata 148. The metadata 148 can specify, for example, an application with which the schedule data objects are to be used. The metadata 148 can also specify one or more types or categories for the schedule data objects. For example, in the amusement park example, categories can represent discrete operational units of the park, or logically organized sets of activities and associated data, including data received from IOT devices. Categories that might be defined for an amusement park application include visitors (e.g., information related to a number of visitors in the park, admission attempts, status of admission gates or turnstiles, number of admission gates open, staffing, etc.), attractions (e.g., various rides, their operational status, waiting times, maintenance issues, etc.), restaurants (e.g., operational status, capacity, staffing, number of point of sale terminals open, inventory, etc.), shops (e.g., operational status, number of point of sale terminals open, inventory), parking and traffic (e.g., road status, waiting times, parking lots open, parking lot capacities used, staffing, etc.), and health and safety (e.g., information on hazardous conditions in the park, which could also be an attraction, shop, etc., or information regarding accidents or injuries experienced by park staff or park visitors) As will be further described, the metadata 148, including category information, can be used for various purposes, including for determining what information should be provided in a particular display, or for providing a display that relates to a specific category of information.

A schedule data object can have one or more activities 150, which can be specified, for example, by data members of a data type or fields of a database table. An activity 150 can be a particular task that is to be accomplished, or type of information to be monitored. An activity 150 can have components that are specified with respect to sensors 154, metrics 156, sequence information 158, queries 160, or a combination thereof. Specification of sensors 154 can be used to determine what sensor readings should be supplied to what schedule data objects or activities 150 thereof. The sensor readings can then be used for various purposes, such as in a display of information related to an activity 150 or in calculating an alert 152 or an action that should be taken in response to an alert. When the sensor 154 is a camera 116, images, still or video, received from the camera may be used in rendering a display, such in an application 162 in communication with the monitoring component 128. In particular examples, the application 162 can be executing on a different computing device than the monitoring component 128, such as on a mobile device. Rendering functionality can be provided by the application 162, the monitoring component 128, or a combination thereof.

In the amusement park management example, an activity 150 can be "parking," which may be associated with sensors 154, such as admission control devices 108 that track a number of vehicles that have entered a parking lot, admission control devices that track a number of vehicles that have exited a parking lot, a camera 116 that can be used to determine parking use at particular locations, etc. Sensors can include camera 116 that can be used to determine wait times (e.g., for vehicles or people, such as by determining the length of a line and a throughput) or capacity. Sensors 154 can also include mechanical sensors 110 included on attractions, such as to determine the status of the attraction or whether the attraction is in need of repair. For instance, a number of braking events or ride operations can be determined, which can be correlated with a preventative maintenance schedule, which in turn can be used to automatically order parts or schedule service events. Computing device alerts 124 can be accessed and used by an activity 150 in a similar manner as sensors 154.

Although generally described as involving data push, including based on various triggers (e.g., sensors triggered, errors detected), the monitoring component 128 can request data (e.g., data pull) in some aspects, or the data sources can periodically provide updated or current data to the monitoring component even without a trigger event. Or, a trigger event can be an event such as the passing of a time period (e.g., providing new data every 10 minutes) or upon a request.

The metrics 156 can specify values that can be calculated using data from the sensors 154 (including from computing device alerts 124), other data specified in the activity 150, data from external data sources 164, or a combination thereof. The external data sources 164 can be, for example, one or more databases maintained on one or more database systems, or other types of external data sources 164. The external data sources 164 can be located on a different computing device or system than the monitoring component 128, or can be located on the same computing device or system as the monitoring component.

External data sources 164 are typically in a different application or computing environment than the monitoring component. That is, a data source 164 may be primarily associated with another application or functionality. However, data sources referred to as external data sources 164 can be incorporated into the monitoring component 128 if desired, or can be included in the same application or computing environment. External data sources 164 can be, for example, in the case of the amusement park example, data sources with human resources data (e.g., employee records, staffing data, payroll); inventory systems for shops and restaurants; financial or accounting systems; systems with repair or maintenance information (which can include scheduled maintenance, parts information, vendor information, etc.) for attractions, shops, or restaurants; parking systems; geographic information systems; or other external data sources.

In some cases, the metrics 156 can specify data that should be stored in a schedule data object and used for display or calculation purposes. The schedule data objects can include formulae, methods, API calls, etc. for determining calculated values, including calculated values that are based at least in part on data from the sensors 154 or the external data sources 164.

In the amusement park example, a metric 156 can be a number of attractions (such as a number of attractions having a particular status, such as operational, on hold, undergoing maintenance, closed, etc.), a number of parking spaces (such as a number of parking spaces having a particular status, such as free or occupied), a number of visitors, etc. The metrics 156 can help a user determine the status of an activity 150, such as whether the activity is proceeding as planned or expected, or if unusual circumstances exist that possibly should be addressed. Similarly, in at least some cases, the metrics 156 can allow unusual circumstances to automatically be addressed, or otherwise used in automatically executing actions associated with the activity 150.

The sequence information 158 can be used to determine when a particular schedule data object is active or inactive, a priority associated with the schedule data object, or for other purposes. Sequence information 158 can also be used to relate a particular activity 150 to other activities, which can be activities of the same schedule data object or a different schedule data object, which in turn can be of the same category specified by the metadata 148 or of different categories.

The sequence information 158 may determine that activities 150 or alerts 152 will or will not be active for particular days or times, or can be defined differently based on particular days or times that are specified. For example, a current time can be compared with a time, time interval, or schedule specified in the sequence information 158 to determine whether or how an activity 150 or an alert 152 should be displayed, including a priority or status associated with the activity or alert.

As will be further described, some user interface displays use information provided to the monitoring component 128 to determine which information to display and how to display it. For instance, if a user selects a particular time range for a display, only activities 150 and alerts 152 relevant to that timeframe are displayed. Or, an application can determine that only activities 150 or alerts 152 relevant to a specified time frame or window, such as relative to a current time or a time selected by a user, are to be displayed. As to the status associated with an activity 150 or alert 152, a status can include whether the activity or alert is coming due, due, or overdue, or an amount by which they are overdue or coming due. The status information can be visually displayed to a user, in some implementations.

Sequence information 158 can also be used to order activities 150, such as in a display, to determine how activities are to be activated or deactivated, or whether or in what manner the activities should be displayed. For instance, a sequence of steps, or activities 150, may be defined to accomplish a particular task. Once an activity 150 in the task is accomplished, a next activity can be displayed, or displayed in a different manner (e.g., highlighted), to help guide a user through the task. Or, the sequence information 158 can be used to automatically trigger one or more actions that are associated with a task.

Queries 160 can be executed to obtain information from other data sources, such as the external data sources 164, or to pull information from the sensors 110, 112, 114, equipment monitoring devices 120, information corresponding to computing device alerts 124, or from consumer application 130. The queries 160 can be used in calculating metrics 156 or in processing sequence information 158. Queries 160 can also be used to obtain additional data that can be displayed in association with an activity 150.

The alerts 152 can define actions that are taken when conditions are met associated with an activity 150, or a combination of multiple activities. An alert 152 can include one or more triggers (or conditions) 166, one or more messages 168, one or more actions 170 that are to be taken or generated (e.g., displayed to an end user or added to a task list, which can be implemented in the form of a collection of activities 150), and one or more queries 172.

A trigger 166 can define the conditions under which the one or messages 168 will be sent or activated, an action 170 will be taken or created, upon which a query 172 will be executed, and combinations thereof. A trigger 166 can be specified in terms of information retrieved (or calculated or derived from) sensors 154, metrics 156, sequence information 158, queries 160, or a combination thereof, which information may be for one activity 150 or across multiple activities. When multiple activities 150 are associated with an alert 152, the activities can be for the same schedule data object or for different schedule data objects.

In the amusement park example, a trigger 166 can be set for a component exceeding a certain temperature or a certain number of uses as determined by sensors 154, or a parking lot or line exceeding a certain capacity, which can be determined by a combination of sensors (e.g., a number of cars that have been admitted to a parking lot or camera information showing a number of parking spaces being occupied) and metrics 156 (e.g., a number of parking spaces that are available in the lot).

In some cases, if a condition of a trigger 166 is met, one or more messages 168 can be sent, such as to a user or to another computing system. The messages 168 can be reflected in a display provided to a user, such as using the application 162. Similarly, if a condition of a trigger 166 is met, one or more actions 170 can be taken, which can be actions to ameliorate or address a condition associated with the trigger. Actions 170 can be in the form of instructions to be sent to a computing device to take various actions, and can be specified, at least is some cases, by creating or activating an activity 150.

In the amusement park example, actions 170 can include actions such a automatically ordering replacement parts or scheduling service for an attraction that is in need of repair or replacement, alerting staffing based on capacity at an attraction, shop, restaurant, entry point, etc., diverting traffic or providing traffic alerts (e.g., by automatically activating or changing messages displayed on automated signage), scheduling the opening or closing of attractions, shops, parking, restaurants, etc., based on capacity, or making adjustments to inventory based on park capacity and operations (e.g., placing additional orders for products to be sold in shops or used in restaurants, or adjusting the amount of an upcoming order based on a predicted need). Actions can also involve crowd control measures, such as diverting patrons to or away from different areas, alleviating congestion issues, and maximizing utilization of park resources by providing messages to the patrons using park signage or consumer application 130, perhaps providing incentives, such as discounts, passes to special shows, or other rewards.

The monitoring component 128 can include, or access, a predictive analytics component or library 180, which can include one or more machine learning techniques 182. The predictive analytics library 180 can be used, among other things, to help determine or process alerts 152, including determining how triggers 166 should be set and what messages 168 should be sent or action 170 should be taken. At least initially, the monitoring component 128 can track actions that are taken in response to the schedule 146, and use the actions and associated information as training data. Alternatively, the alerts 152 can be set using defined rules or heuristics. Once, for example, a machine learning technique 182 has been sufficiently trained, it may be used to adjust alerts 152 or create new alerts. In at least some cases, a machine learning technique 182 may also be used to adjust activities 150 or create new activities.

Example 3—First Example User Interface Screen

Figure 2:
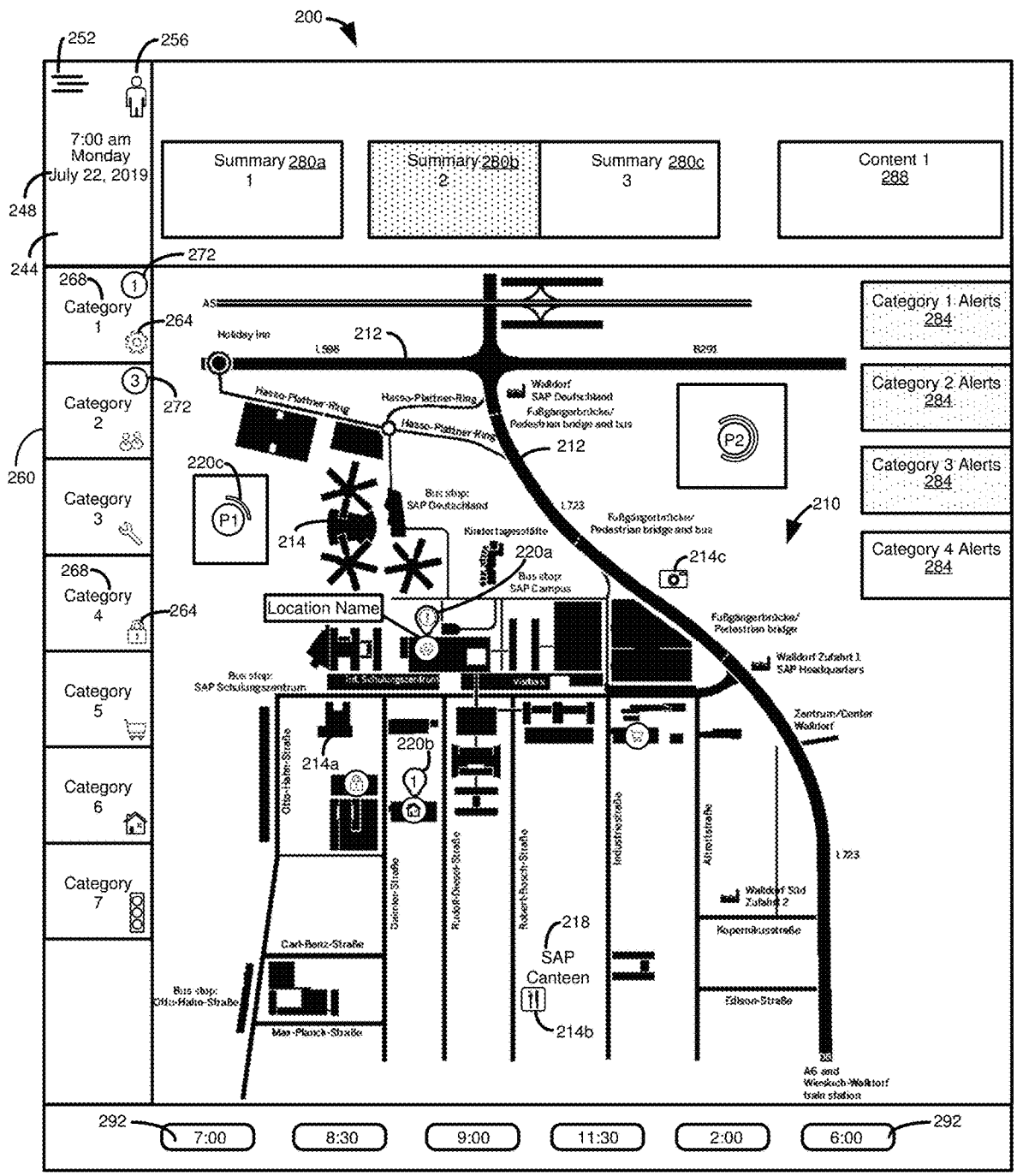
FIG. 2 is a schematic diagram of an example user interface screen that includes a map and a plurality of places or objects of interest, and which can be used to display information received from, or based at least in part on information received from, a plurality of internet of things devices.

FIG. 2 is a diagram representing an example user interface screen 200. The user interface screen 200 can be generated at least in part using the computing environment 100 of FIG. 1. In particular, the screen 200 can be rendered by the monitoring component 128 or the application 162 of FIG. 1. Data associated with the screen 200 can be retrieved from the monitoring component 128 or the external resources 164.

The screen 200 includes a map portion 210. At least part of the map portion 210 can be retrieved from, or augmented with, information from a graphical information system (GIS). For example, the GIS can be used to provide real-time traffic data, or provide information regarding historical or predicted traffic conditions. The map portion 210 can include representations of roads 212, which representations can be displayed in a manner that provides information regarding present, historical, or future road conditions (e.g., red for road sections that are currently congested, green for roads where traffic is flowing normally, and yellow for roads that are approaching capacity or beginning to experience delays).

The map portion 210 can include representations or icons 214 of buildings or other points or objects of interest (e.g., in the amusement park, hypothetical, rides, gaming areas, kiosks, etc.). As shown, the representations 214, such as representation 214a, can at least generally resemble an outline or scaled image of the building or place or object of interest. In other cases, such as to help keep the map portion 210 less visually cluttered, the representations 214a, or a portion thereof, can be omitted, and icons 214b can be used to indicate a building or point or object of interest. An image on the icon 214b, and a label 218, can be used to identify the particular building or point of interest. For example, the icon 214b can indicate the presence of a building that serves as a restaurant, and the label 218 can identify the building as the SAP canteen. In the hypothetical scenario of an amusement park, icons 214b having images of a rollercoaster or other rides could be used to distinguish attraction points of interest from restaurants or shops, for example.

Icons 214b can be used to indicate other types of features of interest, including data sources, such as IOT devices or sensors. For example, icon 214c can represent a traffic camera. In at least some cases, at least a portion of the icons 214b can be selectable, where selection of the icon provides additional information regarding the represented building, IOT device, etc. Selecting the icon 214c, for instance, might provide a display of video or images that have been captured by the camera. Selecting the icon 214b for the canteen may display information such as a seating capacity, a current capacity, a number of open point of sale terminals, a number of employees currently working or scheduled to work at that location, inventory information, financial information, other information, or combinations thereof.

The map portion 210 can include information to alert a user to status information associated with the representations 214 or other features. In particular, the information may be used to provide warnings or alerts for items that may present problems for a user or which should be addressed by the user. The presence of such information can be indicated using status identifiers, or icons, 220. The status identifiers 220 can display information that can help a user to understand the nature of the problem or issue associated with a particular status identifier.

For instance, status identifier 220a can represent a warning symbol. A user may select the status identifier 220a to bring up additional information associated with the warning. The status identifiers 220a can have visual features that can convey additional information. For instance, the status identifiers 220 can be color coded to represent an urgency or degree of seriousness of an issue, such as having red status identifiers representing critical issues and orange status identifiers indicating urgent, but non-critical issues.

In some cases, a representation 214 can be associated with multiple issues that should be addressed. Accordingly, at least a portion of the status identifiers 220, such as status identifier 220b, can display a number representing a number of issues that should be addressed, or alerts or actions that have been triggered. A status identifier 220c can indicate a metric associated with a representation 214, such as percentage of resources or capacity used or remaining, a waiting time, etc. The status identifier 220c can include text or visual elements to convey metric information. As shown, the status identifier 220c includes an annular status bar, where the length of the bar can be correlated with the metric. The bar can use other visual elements, such as color, to convey status information. For instance, the status bar can be displayed as green when no concerns are present, orange when a threshold is being approached, and red when a threshold is exceeded.

Figure 3:
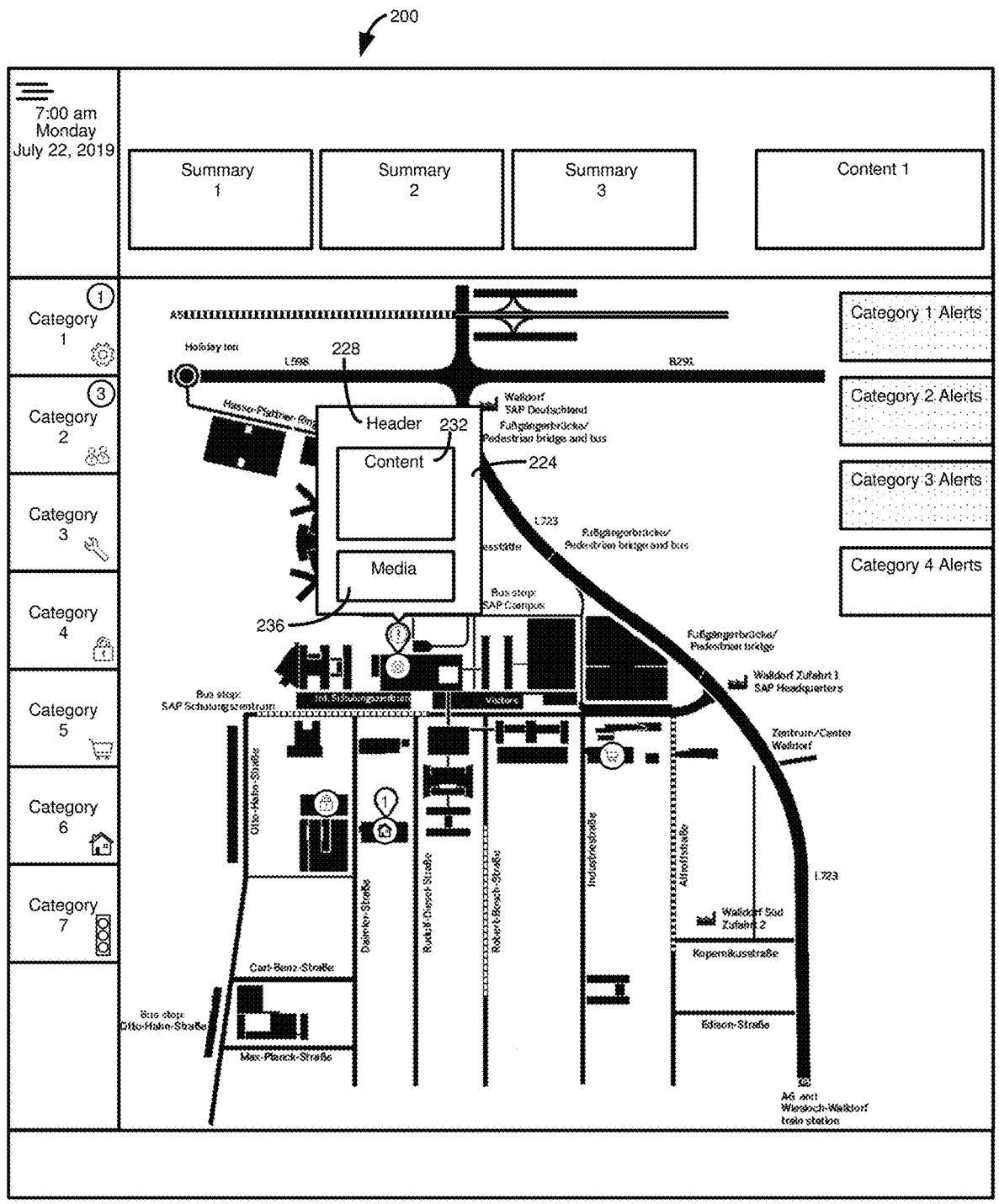
FIG. 3 is the example user interface screen of FIG. 2, showing how an alert box can be displayed to provide additional information about a place or object of interest.

As described above, additional information regarding status identifiers 220 can be displayed to a user once a user selects a particular identifier. For example, FIG. 3 illustrates the screen 200 with the addition of an alert box 224. The alert box 224 can include a header 228, which can be the name or an identifier of a point of interest, monitored device, etc., for which the additional information is being provided. The alert box 224 can include content 232, which can be additional information regarding what has caused the alert to be generated, or actions that should be taken in response to the alert.

In the amusement park example, the header 228 can be the name of an attraction. The content 232 can be, for example, a description of a maintenance issue associated with the attraction (e.g., a part needs to be replaced), and can include resolution information (e.g., order and replace the part). The content 232 can include additional information to assist a user in understanding the seriousness of the alert in the alert box 224, such as an estimated time it will take to perform the resolution action and an estimated down time. The estimated time to perform the resolution action and the estimated down time can be the same in some cases, and different than others. For example, it may take one hour to replace the part, but additional safety testing may be result in an overall down time of two hours.

The alert box 224 can optionally include media content 236. The media content 236 can include real-time or recorded video, or still images, of the place, object, etc., that is associated with the alert box 224. In further implementations, the media content 236 can include media associated with an incident that was responsible for an alert, such as the detection of an error condition, sensor reading, etc. The media content 236 can also include messaging information, such as voice, text, or video information from individuals associated with generating an alert associated with the alert box 224 or who are responsible for attending to the alert.

Returning to FIG. 2, the screen 200 can include a pane or panel 244 in which current time and date information 248 is displayed. The time and date information 248 can be useful in helping a user contextualize other information in the screen 200. For example, the time and date information 248 may be used to help determine the severity of an alert, and to take appropriate actions based on the current time and date information. That is, if the time is comparatively late, then the user may wish to take more aggressive action than if the time is comparatively early.

The pane 244 can include other functionality. The pane 244 can include a menu icon 252, which may allow a user to switch to a different screen, such as another screen described in the present disclosure. The pane 244 may also include a user icon 256, which can provide a representation of a user currently associated with the screen 200. That is, for instance, the screen 200 may show information relevant to a particular user, such as based on a user role, where at least some of the information shown in a screen 200 can differ between different users or different user roles. The user icon 256 can be selectable, such as providing user account information (e.g., settings, security information, contact lists) upon selection.

A category pane 260 can display category icons 264 and category names (or labels or identifiers) 268, which can represent different types of points of interest 214 shown on the map portion 210. However, in at least some cases, not all categories 264 need be associated with a point of interest 214. That is, in some cases, a particular map shown in a map portion 210 may not have any points of interest 214 for a particular category 264. Or, some categories 264 may be categories which are not associated with points of interest 214, but which provide information to a user.

Each category icon 264 can be associated with an alert identifier 272. The alert identifier 272 can be a numerical value that can represent a number of alerts, warnings, action items, etc. that are relevant to a particular category 264. The alert identifiers 272 can be correlated with the status identifiers 220. For instance, each value of the alert identifier 272 can be associated with a particular status identifier 220 (e.g., if an alert identifier 272 has a value of three, then three status identifiers 220 of that type will be shown on the map portion 210, or on map portions associated with different screens 200).

In particular aspects, the user interface screen 200 can change when a category icon 264, category name 268, or the portion of the screen otherwise associated with the category icon is selected. For example, the user interface screen 200 can highlight points of interest 214 that correspond to the selected category 264, or points of interest 214 that are associated with any alert identifiers 272 for the selected category. In another aspect, selecting a category 264 can toggle whether points of interest 214 or alert identifiers 272 are displayed for the category. In a yet further aspect, selecting a category 264 can cause a user interface screen to be displayed that corresponds to the selected category.

The number, type, and identity of categories (and, correspondingly, category icons 264 and category names 268) can vary depending on the specific use case scenario, as well as the particular user (e.g., a particular user role or user settings). In the case of the amusement park scenario, example categories can include visitors, attractions, restaurants, shops, hotels, parking and traffic, and health and safety.

The screen 200 can include (but, in some cases need not include) summary information boxes 280. The summary information boxes 280 can correspond to categories associated with the category names 268. For example, Summary 1, 280a, can correspond to category 1, Summary 2, 280b, can correspond to category 2, and Summary 3, 280c, can correspond to category 3. In other aspects, some, or all, of the summary information boxes 280 need not correspond to a category name 268. For instance, the summary information boxes 280 may correspond to various systems, such as IOT categories or information technology (IT) systems, of an organization. In general, the summary information boxes 280 can define categories that are relevant to a particular user.

While in some cases each summary information box 280 includes information for a specific category 268, in other cases a single summary information box can include information for multiple categories. For example, one summary information box 280 can include information regarding normally-functioning systems or system aspects, and another summary information box can include information regarding systems or system aspects associated with alerts. In the amusement park scenario, a common system may manage point of sale terminals and a mobile application that can be used by park visitors, and information for both items may be included in a common summary information box 280. Information displayed in a summary information box 280 can, in at least some cases, be based on particular metrics or rules, such as those defined with respect to a schedule data object of the rule base 144 of FIG. 1.

Although multiple summary information boxes 280 are shown in a particular portion of the screen 200, the display of the summary information boxes can be varied, if desired, including omitting the summary information boxes from the screen. In some cases, a single summary information box 280 is included. Summary information boxes 280 can be displayed in other locations, such as overlaid over the map portion 210. Or, information described as associated with a summary information box 280 can be displayed in another manner.

In some aspects, one or more of the summary information boxes 280 are selectable. Selecting a summary information box 280 can, in some cases, cause the display of a screen that provides additional details regarding the content of the summary information box, such as a summary information box that provides details for a particular IOT or IT system. The detail screen can be, or can be similar to, one of the screens described in conjunction with FIGS. 4-9.

The summary information boxes 280 can be displayed in different styles, such as to help distinguish one category from another, or to highlight information boxes that are associated with alerts or which may otherwise be of particular relevance to a user. In the amusement park example, summary information presented in the boxes 280 can include information such as a number of point of sale terminals that are online, a number of users of a mobile app, a predicted number of visitors, a predicted waiting time (e.g., waiting time to get into the park, an average waiting time for an attraction, or for a class of attractions), a status of a parking system (e.g., running, delayed, a percent capacity reached, whether accidents have been reported), and information regarding the operation of automated entry equipment (e.g., automated turnstiles). If a summary information box 280 is not associated with any adverse conditions (e.g., all point of sale terminals are functioning correctly), the summary information box can be displayed in a first visual style, such as having a white or gray background. If the summary information box 280 is associated with an adverse condition (e.g., one or more point of sale terminals are not functioning properly), the summary information box can be displayed in a second visual style, such as having a yellow or red background, which can depend on the severity of the adverse condition. As mentioned above, an "adverse condition," in at least some aspects, can be determined using a schedule data object.

The screen 200 can display one or more alert information boxes 284. The alert information boxes 284 can provide information regarding alerts associated with particular categories 264, or an aspect of such categories. In a particular example, an alert information box 284 is provided for each category 264 that is associated with an alert identifier 272. The alert information box 284 can provide information describing the alert identifier 272.

In the amusement park example, if an "attraction" category has an alert identifier 272 with the value of three, an alert information box 284 can include information describing the issue as "3 attractions need inspection." For restaurants, text that can be presented in an alert information box 284 can include "food delivery issue," while for shops, the text might be "delivery issue" or "POS issue." Information displayed in an alert information box 284 can be based on particular metrics or rules, such as those defined with respect to a schedule data object of the rule base 144 of FIG. 1.

Although at least some alert information boxes 284 typically include information about information causing an alert, in the absence of an alert, an alert information box 284 can provide information that describes a normal operating condition. For instance, in the case of "accidents," "0 accidents reported" can be displayed in an alert information box 284. Thus, the alert information boxes 284 can be thought of as a place where a user can look to get information about an alert, and be notified of an alert, but can receive information showing normal operation (e.g., status information) as well. Showing information reflecting normal operation can be useful, as it can help reassure a user than an alert condition does not exist.

In some aspects, the alert information boxes 284 can serve as filters. For example, by selecting (or deselecting) an alert information box 284, the map portion 210 can display (or stop displaying) status identifiers 220 associated with that alert information box. Or, selecting or deselecting an alert information box 284 can cause the associated status identifiers 220 to be visually distinguished on the map portion 210 (e.g., flashing, being shown in a different color). Thus, the alert information boxes 284 can also serve as navigational aids for the map potion 210. In some cases, the alert information boxes 284 only relate to information that is presented (or presentable) on the map portion 210.

The alert information boxes 284 can be displayed in visually distinguished styles, such as to highlight differences in types or categories of alerts, or alert severity. For example, as described for the summary information boxes 280, the alert information boxes 284 can have a background (or other visual identifier) that is correlated to a severity or status of an alert (e.g., normal, non-critical alert, critical alert, which can be displayed, for example, in white or grey, yellow or orange, and red, respectively). As described above, the alert or status can be determined using a schedule data object.

The screen 200 can include additional content 288. The additional content 288 can, but need not, relate to a category 264, the map portion 210, a summary information box 280, or an alert information box 284. For example, the content 288 can display weather information, news feeds, or other information.

In some aspects, information displayed on the screen 200, including on the map portion 210, can vary depending on the day (e.g., day of the week), date (e.g., calendar day or season), or time or time period (e.g., morning, evening, or custom-specified time periods). For instance, as described with respect to the schedule data objects of FIG. 1, certain schedule data objects, or activities 150 or alert 152 may be correlated with specific times, or include sequence information 158 that depends on a time. So, for example, the status identifiers 220, representations 214, and other information may change over time, including automatically changing over time.

In further cases, the screen can allow a user to specify a particular time, such as through user interface elements 292. By selecting a particular time period using the user interface elements 292, the user may change the information shown in the screen 200 to correspond to the time period. Such functionality may be useful in allowing a user to focus on tasks or alerts that are due, coming due, or overdue. Thus, the functionality can be useful in organizing activities by task or time period (e.g., opening, closing). If desired, the screen can omit the user interface elements 292.

Example 4—Second Example User Interface Screen

Figure 4:
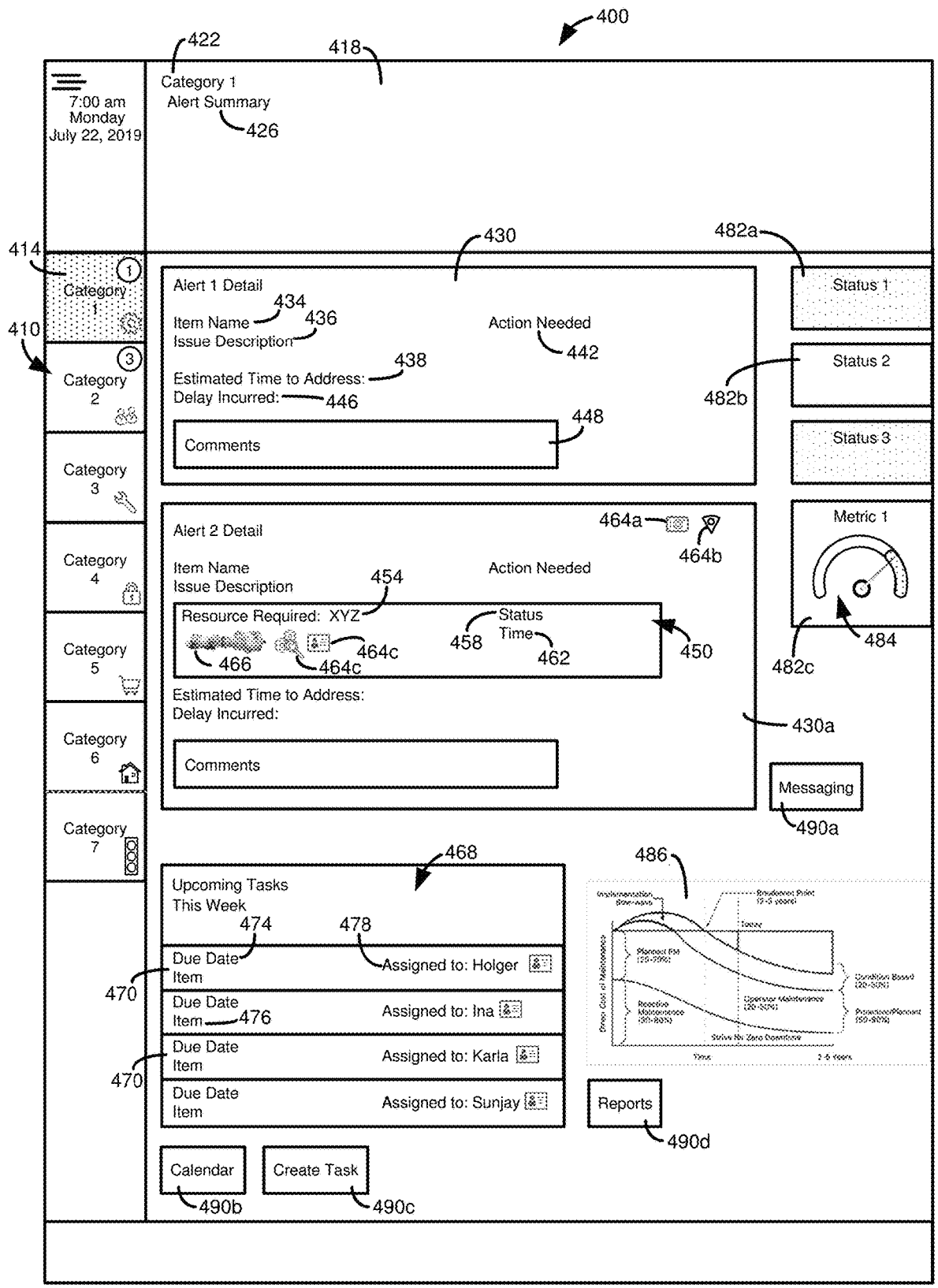
FIGS. 4-9 are schematic diagrams of example user interface screens that can be used to display information received from, or based at least in part on information received from, a plurality of internet of things devices.

FIG. 4 illustrates an example user interface screen 400 that can provide additional detail regarding an activity category that is associated with at least some IOT data. The user interface screen 400 can be implemented using the computing environment 100 of FIG. 1, such as being rendered by the monitoring component 128 or the application 162 and accessing one or more schedule data objects of the schedule 146, data from external data sources 164, or a combination thereof.

In a particular aspect, the user interface screen 400 can be displayed in response to a user selecting a category 264 from the category pane 260 of FIG. 2. However, the screen 400 can be displayed in response to other user actions, in addition to, or in place of, selecting a category through the category pane 260.

The user interface screen 400 can include a category pane 410. The category pane 410 can be at least similar to the category pane 260, and so will not be further described in significant detail. However, the selected category can be displayed in a manner to visually indicate that the category is selected or "active," such as by displaying a region 414 associated with the category in a different color.

The user interface screen 400 can have header information 418. The header information 418 can include the name 422 (or identifier or label) of the selected category. The header 418 can also include alert or status summary information 426, which can be at least generally similar to the information provided in the alert information boxes 284 in FIG. 2.

The user interface screen 400 can include one or more alert detail panels 430. An alert detail panel 430 can provide more detailed or granular information regarding an alert summarized in the status summary information 426. An alert detail panel 430 can include a name 434 or identifier of a point of interest, device, system, object, etc., that is the source of the alert. Generally, the identified subject matter is within the selected category. For example, in the amusement park scenario, if the selected category is "attraction," each of the alert detail panels 430 can relate to a different attraction, which is identified by the name 434.

Detailed information about the subject matter indicated by the name 434 can include a description of the issue 436 that is causing the alert (e.g., malfunctioning system or component, component that needs repair or replacement), an estimated time 438 to address the issue, a suggested or required action 442 to be taken to resolve the issue, and a down time estimate 446 resulting from the issue. A space 448 can be provided for a user to enter comments or view previously entered comments, including comments provided by other users.

Additional information can be included in an alert detail panel 430. For example, alert detail panel 430*a* includes a resource inset 450. The resource inset 450 can provide details regarding a resource that is needed in order to address the alert or condition described in the alert detail panel 430*a*. The resource inset 450 can include a resource identifier 454 (e.g., a part number), a status identifier 458 (e.g., in stock, out of stock, on order), and a time 462, which can be an estimated time until the resource is received.

The alert detail panels 430 can include selectable icons 464 that can be selected in order to obtain additional information regarding the subject matter of an alert detail panel. For example, an icon 464*a* can be selected to provide still or video images associated with the subject matter of the alert detail panel 430 (e.g., an image of an attraction in the amusement park example, images of an entrance to the park, or images of a parking lot). An icon 464*b* can be provided to allow a user to view a location associated with the alert detail panel 430, such as by bringing up a user interface screen that can be at least somewhat analogous to the map portion 210 of the user interface screen 200 of FIG. 2, typically with the relevant location (e.g., a place of interest 214) highlighted on the display (which could include centering the display on that location).

Icons 464*c* can provide links to other data sources, such as a list of contacts or suppliers associated with the resource identifier 454 or to obtain more information about the resource indicated by the resource identifier (e.g., cost, inventory, specifications, user manuals, etc.). The resource insert panel 450 can also include an image 466 of the resource indicated by the resource identifier 454.

The screen 400 can include a schedule panel 468. The schedule panel 468 can provide a list of tasks 470 related to the selected category. The tasks 470 can be associated with a due date 474, an identifier 476, which can identify a particular point of interest, device, item, object, etc., and an assignment identifier 478. The assignment identifier 478 can be used to identify one or more individuals, groups, etc., who are responsible for accomplishing the task.

The screen 400 can include one or more status boxes 482. The status boxes 482 can provide information to a user regarding particular activities associated with a selected category. For example, the status boxes 482 can represent activities 150 associated with the schedule 146 of FIG. 1. The status boxes 482 can include information related to the categories 264 of FIG. 2 (or activities 150 or alerts 152), but can include different, or additional information than the alert detail panels 430. In various aspects, a status box 482 can present information that is at least analogous to information presented in a summary information box 280 or an alert information box 284 of FIG. 2. Typically, the one or more status boxes 482 provide information related to a particular category of information associated with the screen 400 (e.g., a category 268 of FIG. 2.). However, in other aspects, the status boxes 482 can present information regarding multiple categories of information, some of which may not be associated with other information displayed in the screen 400.

The status boxes 482 can be displayed in different visual styles depending on whether the associated box has a normal status or an alert status. While some information, such as in boxes 482*a*, 482*b* can be presented textually, a box 482, such as box 482*c*, can include graphical elements to help convey information, such as graphical element 484. The graphical elements 484 can be tied to elements of the schedule 146, such as showing a current value of a metric or reading in relation to a desired metric or one or more values that might be associated with a category 264, activity 150, or alert 152. The graphical element 484 can also include trend information, such as to show as whether the metric performance is improving or degrading.

In the amusement park example, the status boxes 482 can include information related to attraction status. For example, a status box 482 can represent a number of attractions that are undergoing inspection, are operating normally, are under repair, are closed, or are on hold. A status box 482 can indicate a number of attractions that have passed inspections. A status box 482 can indicate a number of attractions that are currently being prepared for use. The graphical element 484 can be used to convey the average waiting time for an attraction, or attractions overall.

The screen 400 can include additional information content 486. The additional informational content 486 can include data, data visualizations, reports, or report elements. The additional content 486 can include, or be based on, information retrieved from a database. For example, the additional information content 486 can display historical or forecasted information related to the selected category, which can assist a user in making decisions related to alerts described in the alert detail panels 430. The additional information content 486 can be associated with a predetermined database query or view.

The screen 400 may include user interface elements 490 that can allow a user to take a variety of actions. For example, a user interface element 490*a* can allow a user to access messaging functionality, such as to send an electronic message (e.g., instant message, text, email) to another user, but can also include functionality for real-time messaging, including telephonic/video/voice over IP interactions. A user interface element 490*b* can allow a user to access calendaring functionality, which can, in some implementations, include information from the schedule 146. A user interface element 490*c* can allow a user to create a task. A user interface element 490*d* can allow a user to enter a reporting module or to generate reports.

At least a portion of the information presented in the screen 400, particularly the information provided in the header information 418, the alert detail panels 430, and the status boxes can be obtained from information sources such as schedule data objects of the schedule 146 of FIG. 1, including through information of the schedule 146 obtained from the external data sources 164, or directly from one or more of the external data sources 164.

Example 5—Third Example User Interface Screen

Figure 5:
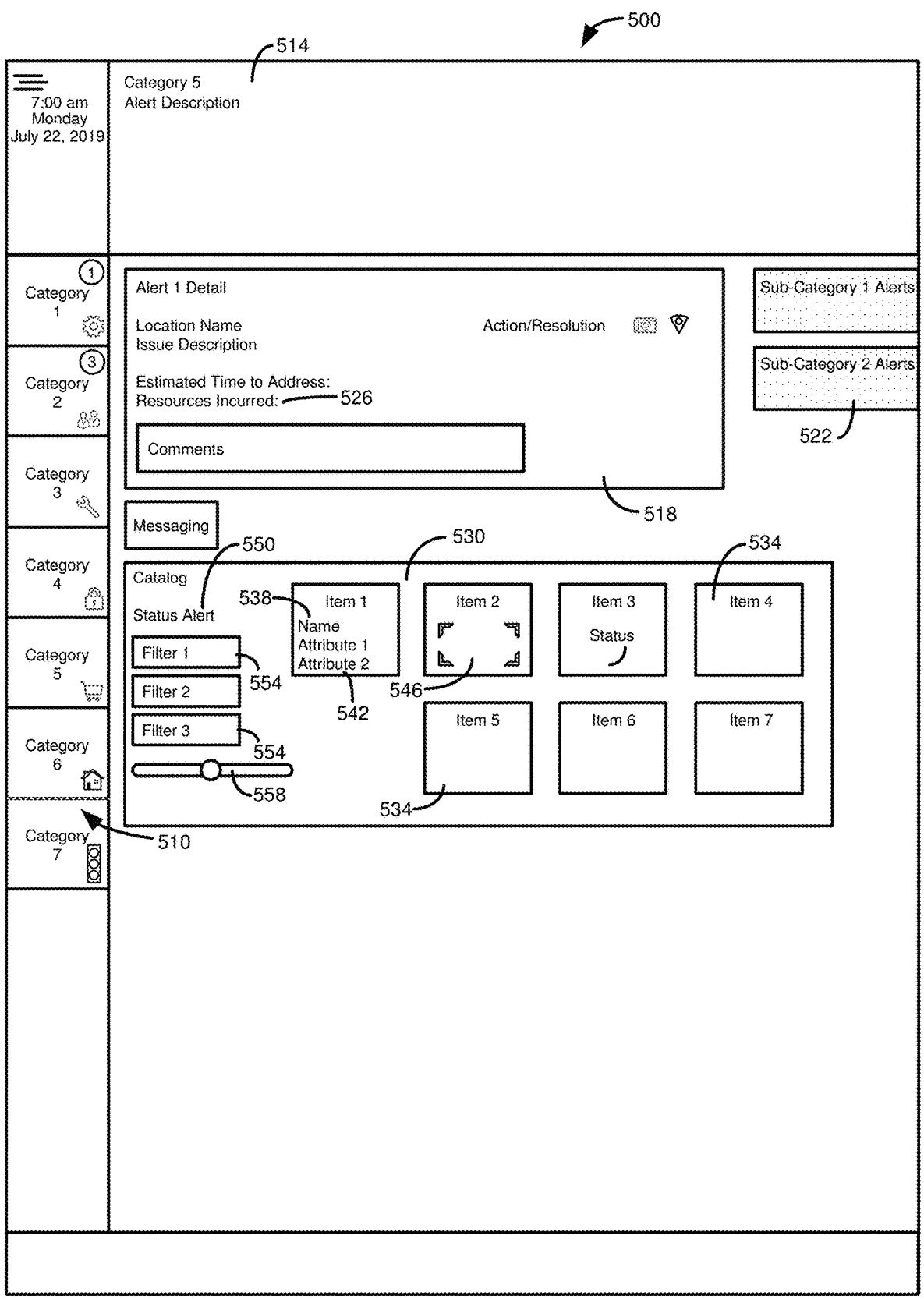

FIG. 5 provides an example user interface screen 500 that illustrates another embodiment of a screen 500 that can provide additional detail regarding an activity category that is associated with at least some IOT data. The user interface screen 500 can be implemented using the computing environment 100 of FIG. 1, such as being rendered by the monitoring component 128 or the application 162 and accessing one or more schedule data objects of the schedule 146, data from external data sources 164, or a combination thereof.

FIG. 5 can include a category pane 510 and header information 514, which can be at least generally similar to the category pane 410 and header information 418. As with the screen 400, the screen 500 can be displayed in response to user action, such as selection of a category from the category pane 260 of FIG. 2, or in response to other user action. Together, FIGS. 4 and 5 illustrate that the information presented in a user interface screen for a category, or the layout of information, can vary depending on the category, design criteria, etc.

FIG. 5 can also include alert detail panels 518 and status boxes 522, which can be at least generally similar to the alert detail panels 430 and the status boxes 482. The alert detail panel 518 differs from FIG. 4 in that it can include information regarding resources (e.g., time, monetary resources, parts, etc.) incurred 526 to address the issue mentioned in the alert.

The screen 500 can include a catalog portion 530. The catalog portion 530 can display information related to a plurality of items 534 associated with the activity. The items 534 can represent items that are used in association with the category associated with the screen 500. In the case of the amusement park example, the items 534 can represent items that are available for purchase from an online shop associated with the amusement park, which are available in stores in the amusement park, or a combination thereof. The catalog portion 530 can include information that is retrieved from a database, such as an inventory database. In other examples, the catalog portion 530 can represent consumable items, such as parts, that are used in association with an activity, such as repairing or maintaining attractions.

Various types of information associated with the items 534 can displayed. For example, a name 538, one or more attribute values 542, an image 546, or a combination thereof can be displayed. In the amusement park example, the name 538 can be the name of the item sold, an attribute value 542 can be an item price, and the image 546 can be an image of the item. Another attribute value 542 that can be displayed is a quantity of items ordered, a quantity sold, a quantity in inventory, etc. Items 534 can also be associated with a status identifier 546, such as an identifier indicating that an item is out of stock, is new, is on sale, etc.

The catalog portion 530 can be associated with one or more status alerts 550. In the amusement park example, a status alert 510 may indicate a number of items that are out of stock. The catalog portion 530 can include filter options 554. A filter option 554 may allow a user to filter items 534 displayed by various criteria, including items matching search terms, items associated with particular categories, items having particular attributes or attribute values, or a combination thereof. Filter options 554 can also include options to sort items 534 by one or more criteria, such as item attribute values 542, including sorting by ascending or descending value. Filter options 554 can be implemented in various manners, including radio buttons, text input fields, drop down menus, and using variable value controls, such as slider bar 558.

Example 6—Fourth Example User Interface Screen

Figure 6:
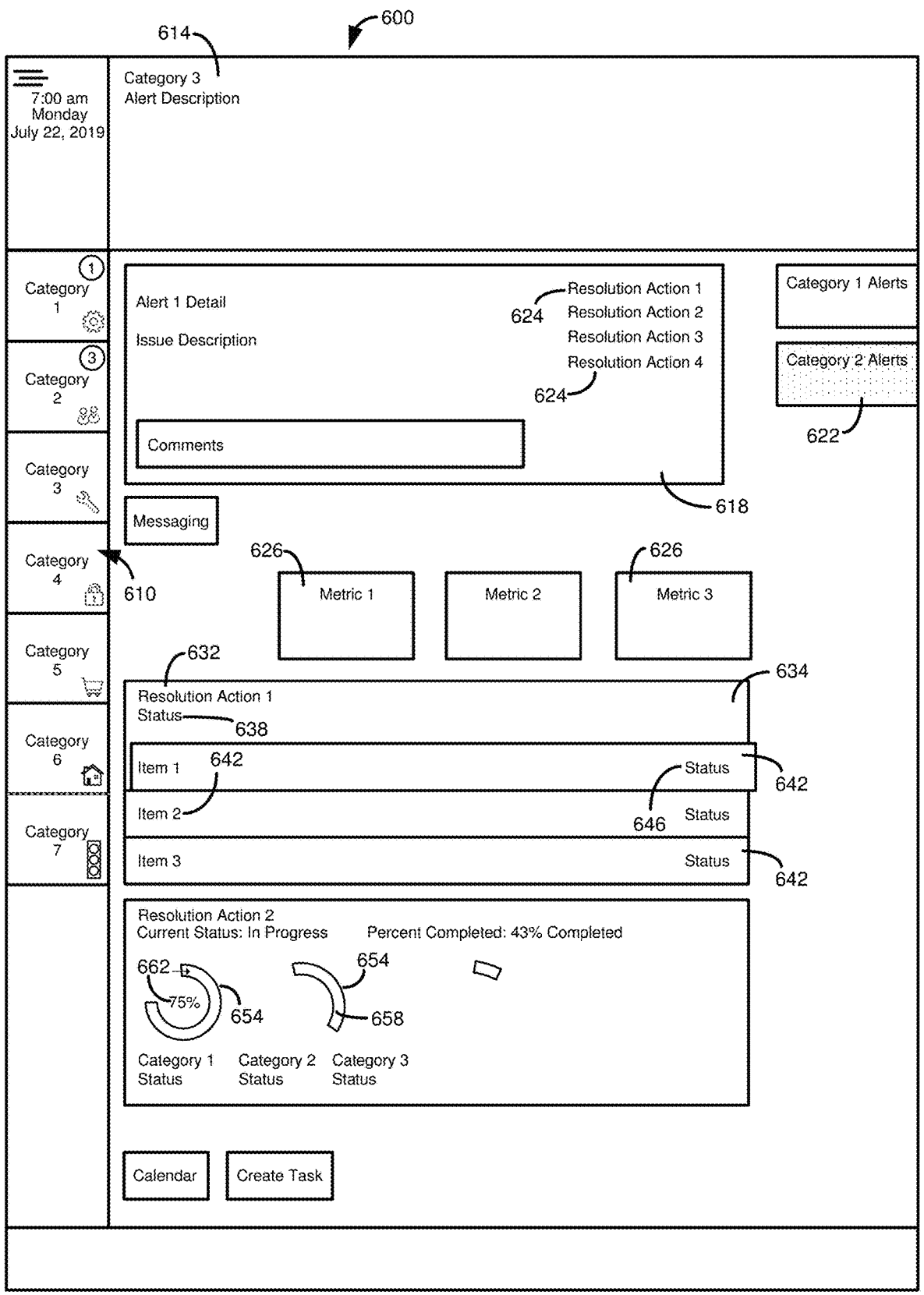

FIG. 6 provides an example user interface screen 600 that illustrates another embodiment of a screen that can provide additional detail regarding an activity category that is associated with at least some IOT data. The user interface screen 600 can be implemented using the computing environment 100 of FIG. 1, such as being rendered by the monitoring component 128 or the application 162 and accessing one or more schedule data objects of the schedule 146, data from external data sources 164, or a combination thereof.

FIG. 6 can include a category pane 610 and header information 614, which can be at least generally similar to the category pane 410 and header information 418. As with the screens 400, 500 the screen 600 can be displayed in response to user action, such as selection of a category from the category pane 260 of FIG. 2, or in response to other user action. FIG. 6 can also include alert detail panels 618 and status boxes 622, which can be at least generally similar to the alert detail panels 430 and the status boxes 482. The alert detail panel 618 illustrates that multiple suggestions 624 can be provided for dealing with an alert.

The screen 600 includes metric boxes 626. The metric boxes 626 can present information regarding various metrics or other informational items related to an activity or the general category associated with the screen 600. The metric boxes 626 can include metric information retrieved from the schedule 146 of FIG. 1. The metric boxes 626 can, but need not be, associated with an alert. For example, the metric boxes 626 can be shown even if no alert has been set, or if alert has been set but has not be triggered. Metrics boxes 626 can also include other types of variable data that may not be associated with a metric. For example, a weather forecast can be provided in a metric box 626.

At least a portion of other information presented in a metric box 626 can be obtained from, or calculated using, information in a database. For instance, the metric boxes 626 can compared current data with historical data, other types of prior data, or forecasted data. In one particular implementation, the metric boxes can provide information regarding the change in a quantity over a time period, such as the last 24 hours, the last week, the last month, last quarter, last year, and the like.

If desired, the display 600 can include information describing a timeframe or reference for the metric boxes 626 (e.g., changes represent changes in the last 24 hours). In the amusement park example, information that can be presented in the metric boxes 626 can include a current weather forecast, a number of tickets sold, and a number of mobile applications or mobile application functions used.

The screen 600 can provide one or more resolution status or checklist portions 634 for a resolution actions 632, which can be associated with one of the alert detail panels 618. A resolution status portion 634 can include a status identifier 638 for the particular resolution, and can include one more resolution goals or items 642 and a status indicator 646 for each item. In the amusement park example, a checklist portion 634 can provide status information for resolution tasks of opening new restaurants, such as in response to determining that current dining options do not provide sufficient capacity. Each resolution goal 642 can represent a restaurant to be opened, and the status indicator 646 can represent the status of the respective restaurant (e.g., opened, pending, not started).

The screen 600 can include progress icons 654 for one or more of the categories associated with a checklist portion 634. The progress icons 654 can be in the form of a circular progress bar 658 that progresses from a 12 o'clock position for an unstarted task, through the perimeter of the clock towards the 12 o'clock position as the task nears completion. Thus, the progress bar 658 can provide a quick, visual indication as to a task or activity status.

The progress bar 658 can be shown in multiple visual styles, if desired. For example, the entire perimeter of the circle can be displayed, and a portion of the progress bar about the portion of the perimeter corresponding to completion can be shown in a first color or visual type and a second portion about the portion of the perimeter corresponding to incompletion can be shown in a second color or visual style. A metric value, such as percent completion 662, can be displayed within the interior of the circular area formed by the progress bar 658.

Example 7—Fifth Example User Interface Screen

Figure 7:
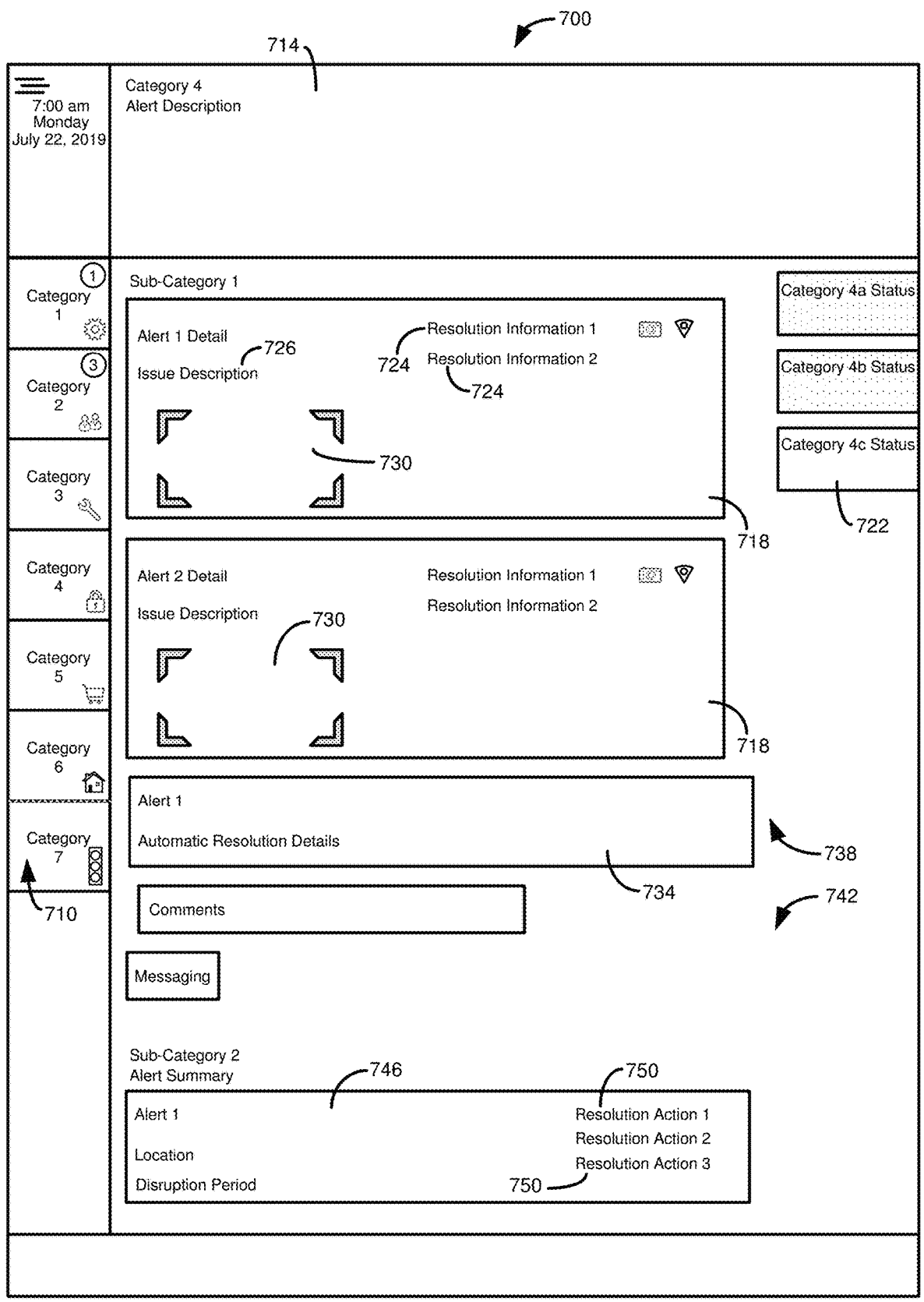

FIG. 7 provides an example user interface screen 700 that illustrates another embodiment of a screen that can provide additional detail regarding an activity category that is associated with at least some IOT data. The user interface screen 700 can be implemented using the computing environment 100 of FIG. 1, such as being rendered by the monitoring component 128 or the application 162 and accessing one or more schedule data objects of the schedule 146, data from external data sources 164, or a combination thereof.

FIG. 7 can include a category pane 710 and header information 714, which can be at least generally similar to the category pane 410 and header information 418. As with the screens 400, 500 the screen 700 can be displayed in response to user action, such as selection of a category from the category pane 260 of FIG. 2, or in response to other user action. FIG. 7 can also include alert detail panels 718 and status boxes 722, which can be at least generally similar to the alert detail panels 430 and the status boxes 482.

The alert detail panel 718 illustrates that multiple suggestions 724 can be provided for dealing with an alert. The alert detail panels 718 can include an issue description 726 that includes location information. In the example of amusement park operation, the location description can be a traffic or parking lot location, and can include one or more of a textual description of the location, GPS coordinates, or a link to a map where the location can be visually indicated.

The alert detail panels 718 can include one or more images 730. The images 730 can be obtained, in some cases, from IOT enabled devices that also include camera or video recorder functionality. In other cases, the images 730 can be obtained in another manner, such as being obtained from a user (e.g., using a mobile device) and uploaded into a computing system where the images can be retrieved by an application rendering the screen 700. The images 730 can be useful in allowing a user to assess the seriousness of a situation or to help them formulate a suitable response.

As has been described, such as in Example 2, in some cases actions can automatically be taken in response to IOT information, including IOT information that triggers an alert. The screen 700 can include a resolution notification box 734 that indicates actions that were automatically taken, such as in response to conditions that resulted in an alert displayed in an alert detail panel 718. In the amusement park example, an automatic resolution action can be altering signage (e.g., electronic signage) to divert traffic to alternate roads or parking areas. Automatic resolution actions can also include opening additional parking areas.

The alert detail panels 718 can be provided in a first section 738 of the screen 700. Additional information can be provided in other areas of the screen 700, including in a second portion 742. The second portion 742 of the screen 700 can include alert detail panels 746, which can be displayed in a different style or format than the alert detail panels 718. For example, the alert detail panels 746 do not include images 730. The alert detail panel 746 can list one or more resolution actions 750, which can include actions that were automatically taken, actions that were manually taken, or a combination thereof. In the amusement park example, the second portion 742 of the screen 700 can relate to traffic conditions (where the first portion 738 relates to parking). The resolution actions 750 can include actions such as updating directions that are provided via a mobile application, providing updates to local traffic sensors or GIS services, and informing local media (e.g., radio and television) of traffic issues, advisories, or alternate routes.

Example 8—Sixth Example User Interface Screen

Figure 8:
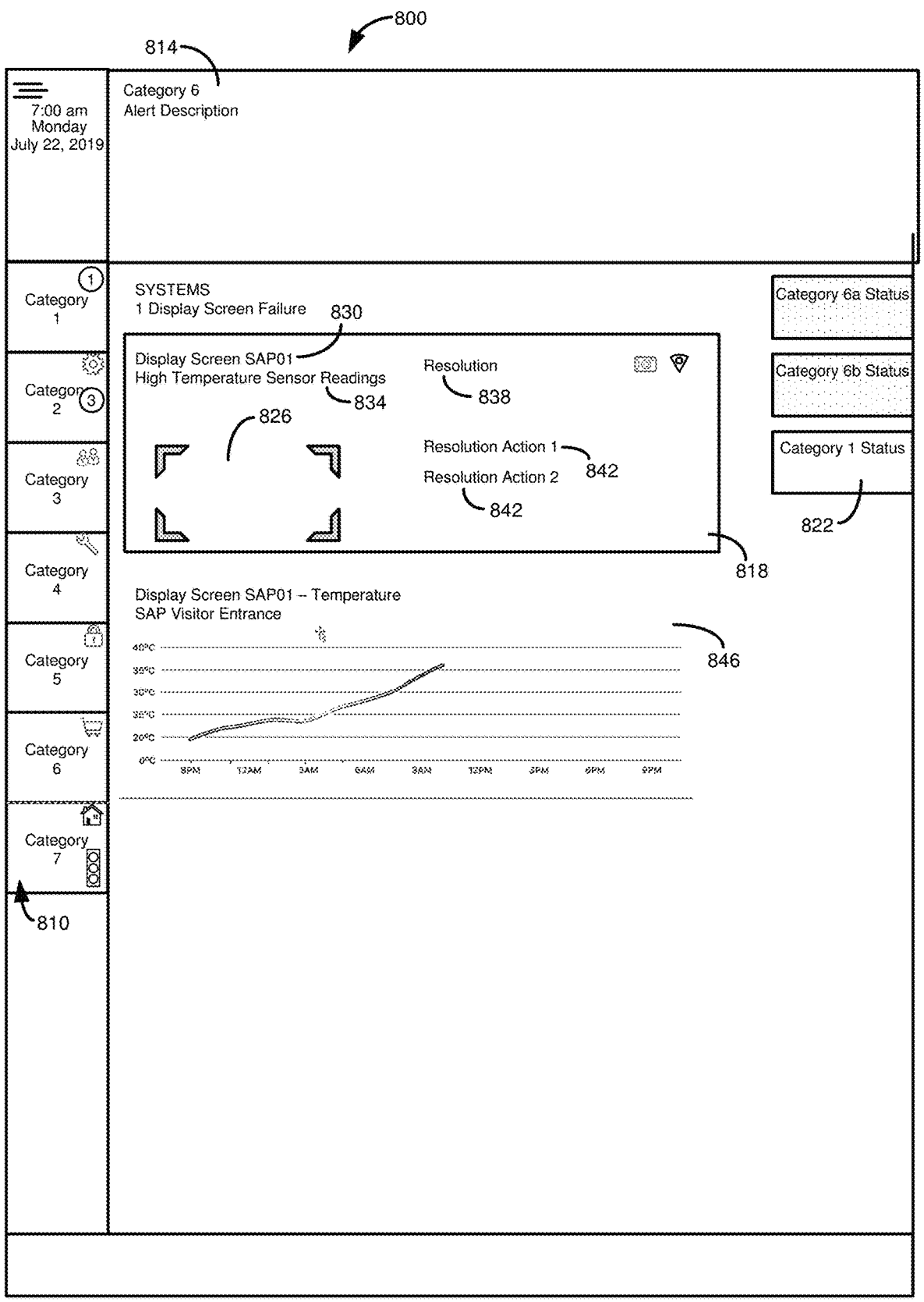

FIG. 8 illustrates provides an example user interface screen 800 that illustrates another embodiment of a screen that can provide additional detail regarding an activity category that is associated with at least some IOT data. The user interface screen 800 can be implemented using the computing environment 100 of FIG. 1, such as being rendered by the monitoring component 128 or the application 162 and accessing one or more schedule data objects of the schedule 146, data from external data sources 164, or a combination thereof.

As with the screens 400, 500 the screen 800 can be displayed in response to user action, such as selection of a category from the category pane 260 of FIG. 2, or in response to other user action. FIG. 8 can include a category pane 810 and header information 814, which can be at least generally similar to the category pane 410 and header information 418. FIG. 8 can also include alert detail panels 818 and status boxes 822, which can be at least generally similar to the alert detail panels 430 and the status boxes 482.

As with the screen 700, the alert detail panels 818 can include an image 826, which can be an image or video recorded by a camera, including real-time images. In other cases, the image 826 can be another type of image, such as an image of a device or point of interest associated with information provided in the alert detail panel 818. For instance, the alert detail panels 818 can provide sensor readings from an IOT device, such as a video monitor or display. The sensor readings could be temperature data, would could provide an indication that a display is not functioning properly or is at risk of failure. In this example scenario, the alert detail panel 818 can include an identifier 830 of the device, a description 834 of the issues, and resolution information (e.g., "fix display") 838. The alert detail panel 818 can also include resolution actions 842, which can provide a summary of actions that have been, or need to be taken, to achieve the resolution associated with the resolution 838 (e.g., "Service ticket opened," "Technician notified").

The screen 800 can include a display 846 of sensor data. In the above example, the sensor data can be a graph of display temperature over time. The display 846 can present historical data, real-time data, or a combination thereof.

The status boxes 822 can relate to the same type, including category or subcategory, as a type associated with the screen 800 or the alert detail panels 818, or another type. For example, in the amusement park scenario, the screen 800 may relate to a "systems" category that can also include "admission" related activities and IOT devices. Or, such information can be presented in the screen 800 even if it is not a related category. For instance, it may be desirable to provide status boxes 822 with important information to make sure information is readily accessible to a user, even if the information does not relate to a current screen being viewed by the user. In the amusement park example, the status boxes 822 could provide information related to a number of entry events per user before a user is able to enter an area, such as the amusement park (e.g., to account for failures such as mechanical turnstile malfunction or errors in reading tickets or passes) or a hotel, and an average waiting time (such as to enter an area, including the park overall, a hotel, an attraction, transportation, for dining options, etc.).

Example 9—Seventh Example User Interface Screen

Figure 9:
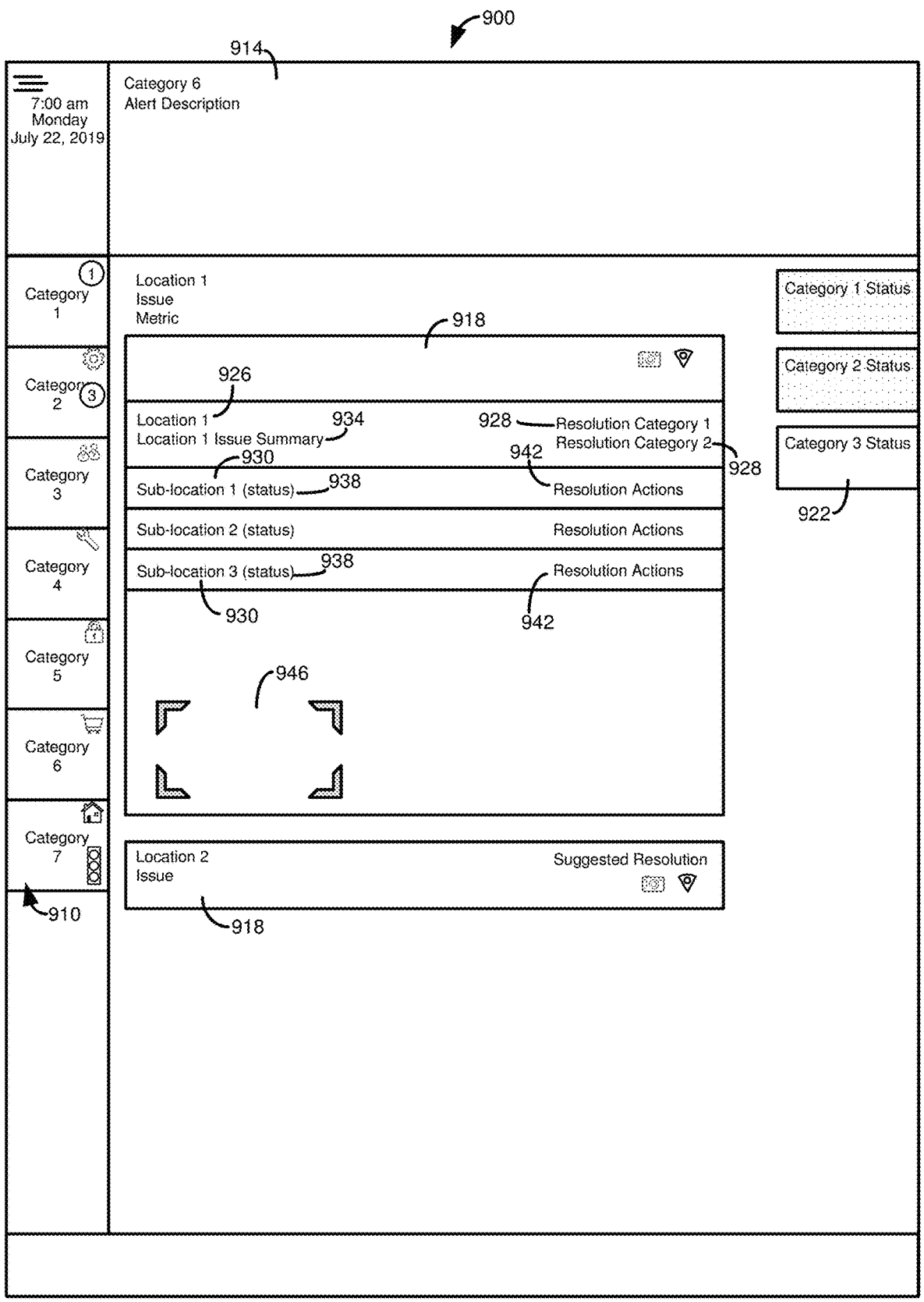

FIG. 9 illustrates provides an example user interface screen 900 that illustrates another embodiment of a screen that can provide additional detail regarding an activity category that is associated with at least some IOT data. The user interface screen 900 can be implemented using the computing environment 100 of FIG. 1, such as being rendered by the monitoring component 128 or the application 162 and accessing one or more schedule data objects of the schedule 146, data from external data sources 164, or a combination thereof.

As with the screens 400, 500 the screen 900 can be displayed in response to user action, such as selection of a category from the category pane 260 of FIG. 2, or in response to other user action. FIG. 9 can include a category pane 910 and header information 914, which can be at least generally similar to the category pane 410 and header information 418. FIG. 9 can also include alert detail panels 918 and status boxes 922, which can be at least generally similar to the alert detail panels 430 and the status boxes 482.

The alert detail panels 918 provide information about a general location 926 and one or more sub-locations 930. In the amusement park example, the general location 926 could be the park main entrance, and the sub-locations 930 could represent individual turnstiles. The alert detail panels 918 can include an issue summary 934 for any issues being experienced at the referenced location (e.g., to many admission attempts, to many failed attempts), and potential types of resolutions 928 for such issues (e.g., open new turnstiles, send technicians, provide more human attendants to assist with admission).

Detailed information can be provided for the sub-locations 930. This information can include a status 938 (e.g., no waiting time, normal operation, a waiting time of X minutes) and any actions 942 that have been, or should be taken, in response to the status. In the amusement park example, actions 942 can include sending additional staff, calling technicians, or diverting customers to other locations, such as other sub-locations 930.

The screen 900 can include other information about the location 926 or sub-locations 930, such as an image 946. In a particular example, the image 946 can include live still or video images of the location 926 or sub-locations 930.

Example 10—Example Operations

Figure 10:
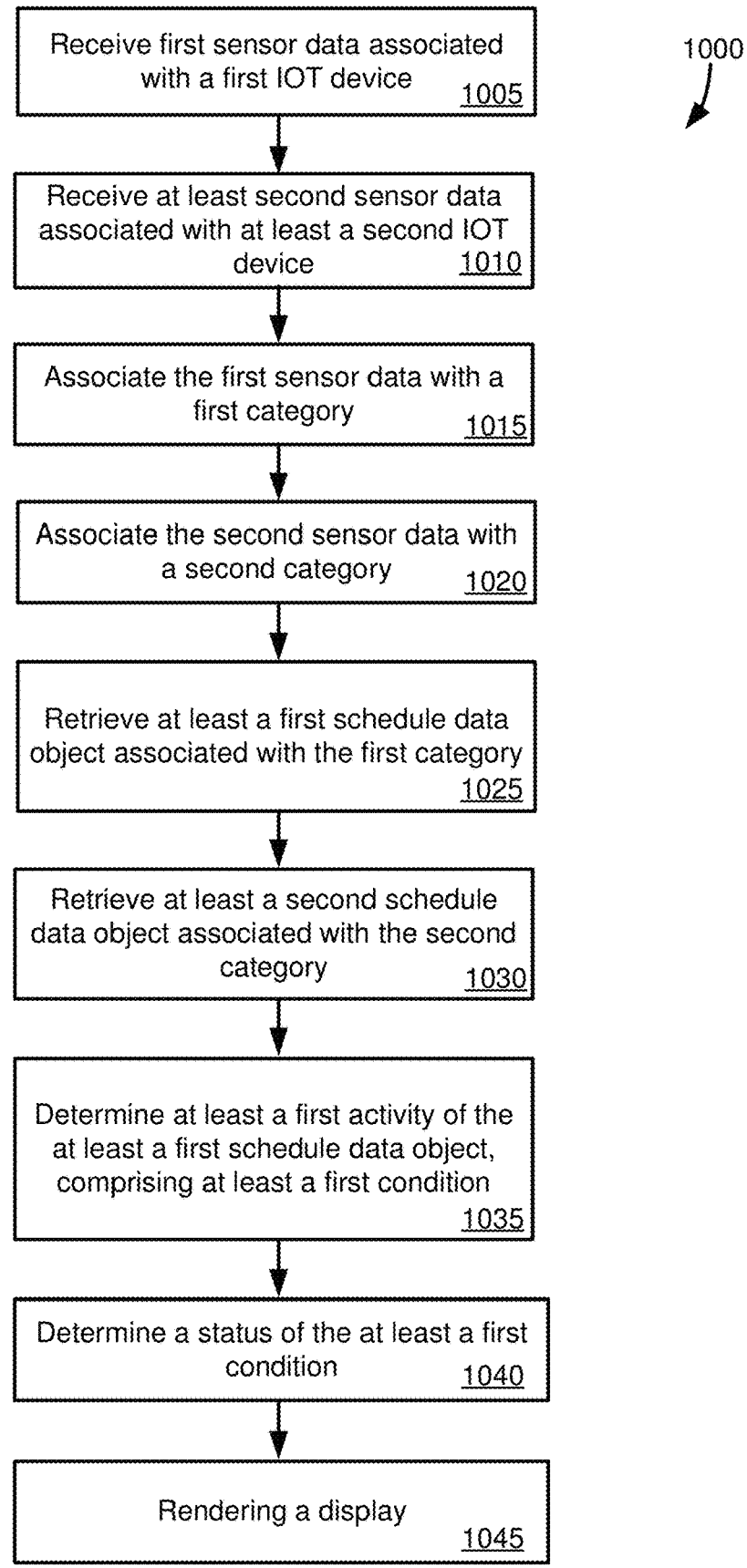
FIG. 10 is a flowchart illustrating operations that can be carried out to render a display that includes information associated with a plurality of internet of things (IOT) devices.

FIG. 10 is a flowchart of an example method 1000 of operations that can be carried out to render a display that includes information associated with a plurality of internet of things (IOT) devices. The method 1000 can be carried out, at least in part, using the computing environment 100 of FIG. 1, and can include one or more of the screens 200-900 of FIGS. 2-9. At 1005, first sensor data from a first sensor is received. The first sensor is associated with a first IOT device. At least second sensor data from at least a second sensor is received at 1010. The at least a second sensor is associated with at least a second IOT device.

At 1015, the first sensor data is associated with a first category. At 1020, the at least second sensor data is associated with a second category. At least a first schedule data object associated with the first category is retrieved at 1025. At least a second schedule data object associated with the second category is retrieved at 1030. At 1035, at least a first activity of the at least a first schedule data object is determined. The at least a first activity includes at least a first condition defined at least in part with respect to at least one of the at least a first sensor and the at least a second sensor.

A status associated with the first condition is determined at 1040. A display is rendered at 1045. Rendering the display can include determining a first current time and determining a time period associated with the at least a first schedule data object. The rendering can also include determining that the time period is associated with the first current time. Selectable icons associated with the first and second categories are rendered. An indication of the status of the at least a first condition is rendered for display.

Figure 11:
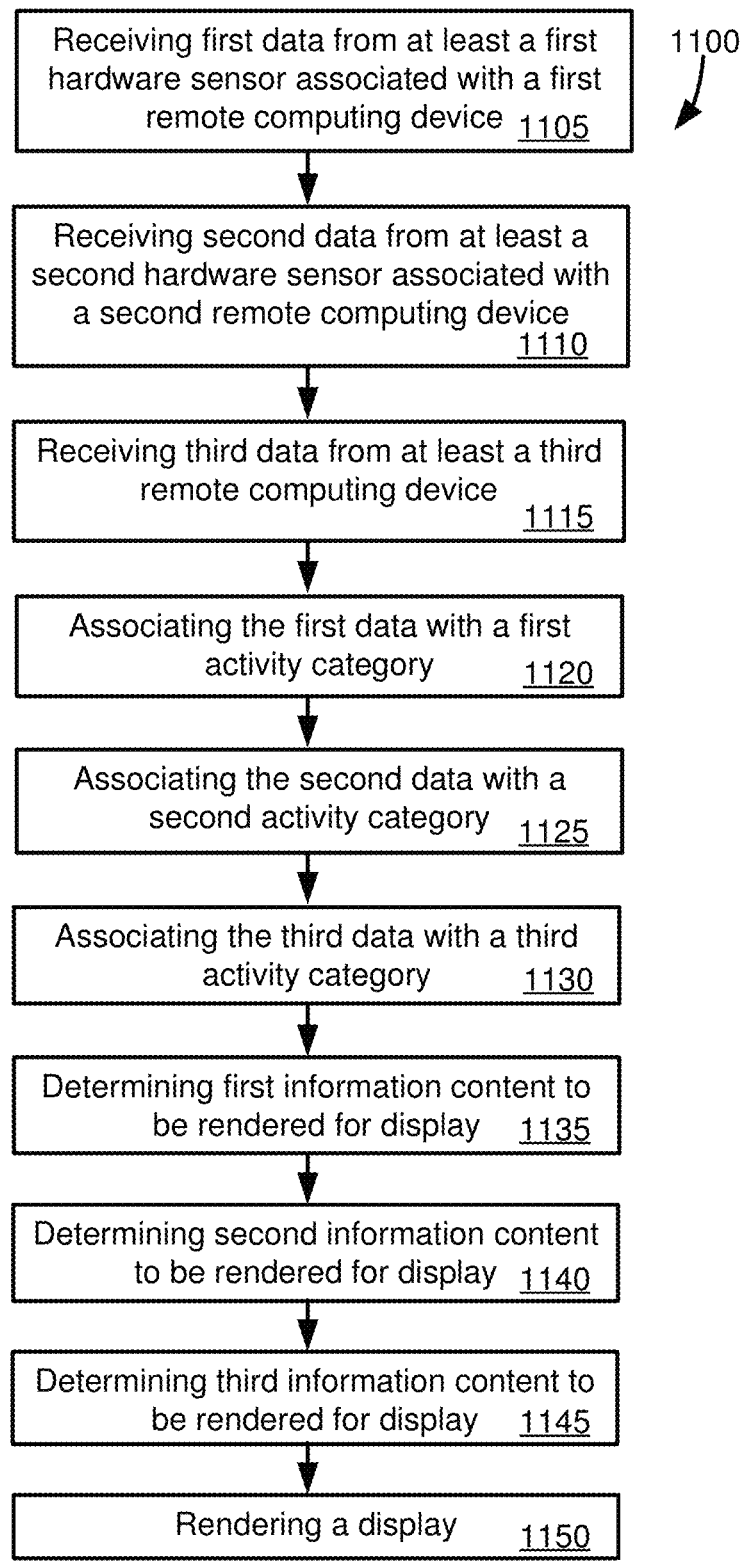
FIG. 11 is a flowchart illustrating operations that can be carried out by a computing system that implements a data aggregation and visualization service for data received from a plurality of hardware sensors

FIG. 11 is a flowchart of an example operations 1100 that can be carried out by a computing system that implements a data aggregation and visualization service for data received from a plurality of hardware sensors. The method 1100 carried out, at least in part, using the computing environment 100 of FIG. 1, and can include one or more of the screens 200-900 of FIGS. 2-9. At 1105, first data from at least a first hardware sensor is received, the at least a first hardware sensor is associated with a first remote computing device, such as an internet of things (IOT) device. At 1110, second data from at least at least a second hardware sensor is received, the at least a second sensor associated with a second remote computing device, such as an IOT device. Third data from at least a third remote computing device is received at 1115. The third remote computing device can be the first remote computing device, the second remote computing device, or another remote computing device. Data received from the at least a third remote computing device includes an indication of an alert, a notification, or an error condition.

The first data is associated with a first activity category at 1120. The second data is associated with a second activity category at 1125. The third data is associated with a third activity category at 1130, where the third activity category can be the first activity category, the second activity category, or another activity category. At 1135, first information content to be rendered for display is determined, the first information content being for the first data and the first activity category. At 1140, second information content to be rendered for display is determined, the second information content being for the second data and the second activity category. At 1145, third information content to be rendered for display is determined, the third information content being for the third data and the third activity category.

A display is rendered at 1150. Rendering the display can include rendering the first information content, the second information content, and the third information content.

Figure 12:
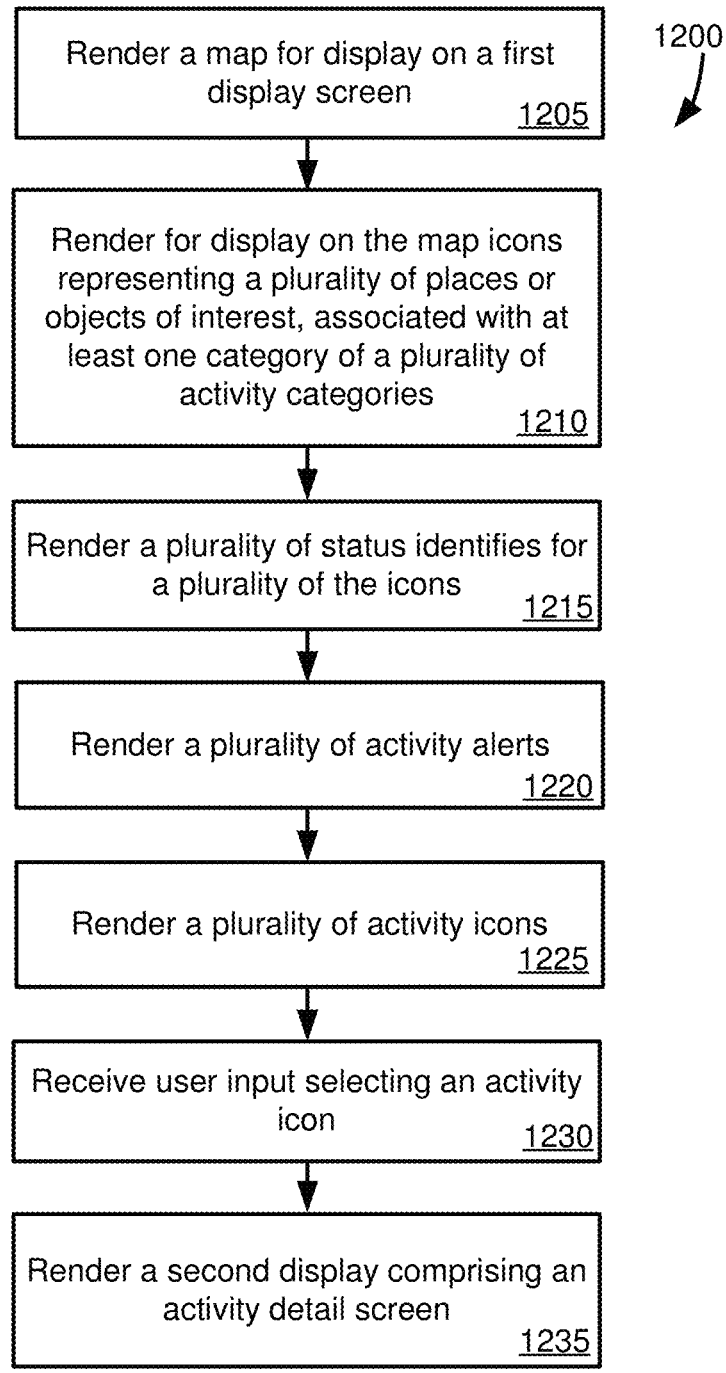
FIG. 12 is a flowchart illustrating operations for providing an aggregated display of information associated with a plurality of internet of things (IOT) devices.

FIG. 12 is a flowchart of a method 1200 for providing an aggregated display of information associated with a plurality of internet of things (IOT) devices. The method 1200 carried out, at least in part, using the computing environment 100 of FIG. 1, and can include one or more of the screens 200-900 of FIGS. 2-9. A map is rendered for display on a first display screen at 1205. At 1210, map icons representing a plurality of places or objects of interest are rendered for display on the map. The plurality of places and objects of interest are associated with at least one category of a plurality of activity categories.

A plurality of status identifiers for a plurality of the icons are rendered at 1215, proximate respective icons. At 1220, a plurality of activity alerts are rendered on the first display screen. The plurality of activity alerts are associated with multiple activity categories of the plurality of activity categories. A plurality of activity icons are rendered for display at 1225, each activity icon representing a particular activity category.

At 1230, user input is received selecting an activity icon of the plurality of activity icons. A second display comprising an activity detail screen is rendered for display at 1235. The activity detail screen displays information retrieved from at least one hardware sensor of at least one IOT device of the plurality of IOT devices or information determined based at least in part on the information received from the at least one hardware sensor.

Example 11—Computing Systems

Figure 13:
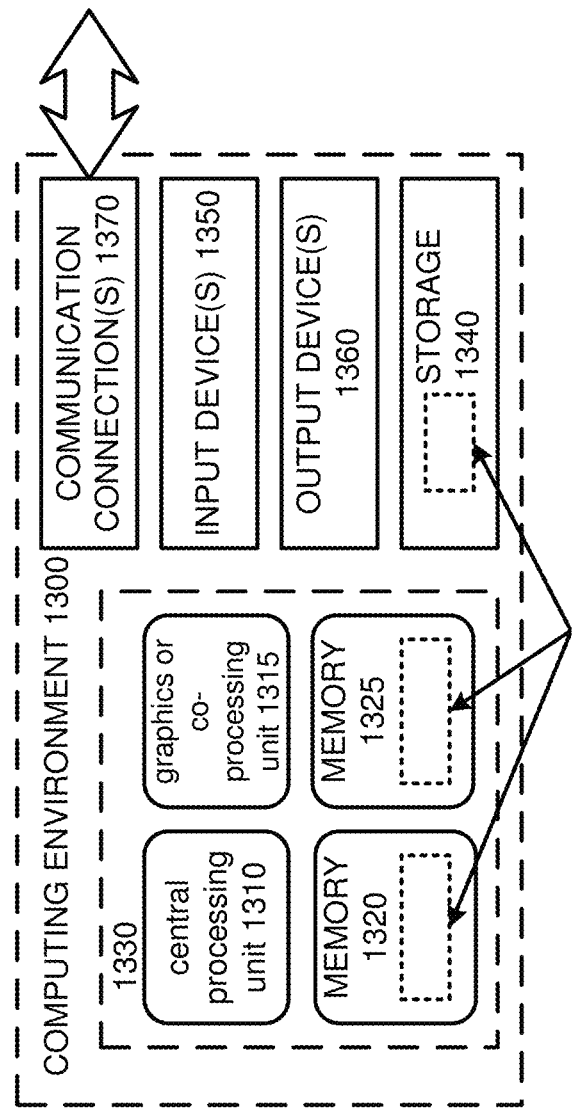
FIG. 13 is a diagram of an example computing system in which some described embodiments can be implemented.

FIG. 13 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing components of the architecture 100 of FIG. 1, including as further described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 14:
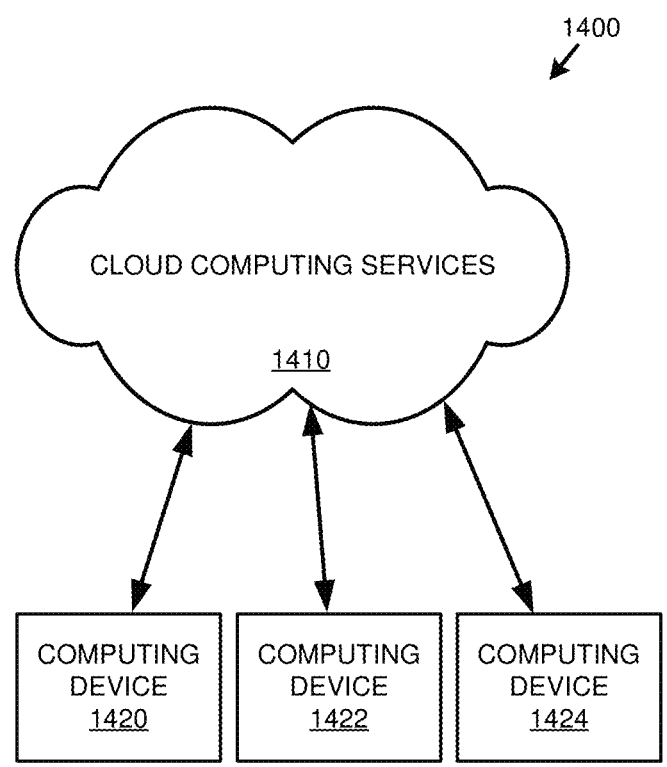
FIG. 14 is an example cloud computing environment that can be used in conjunction with the technologies described herein.

FIG. 14 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1482) can utilize the cloud computing services 1410 to perform computing operators (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 13, computer-readable storage media include memory 1320 and 1325, and storage 1340. The term computer-readable storage media does not include signals and carrier waves. In addition, the term computer-readable storage media does not include communication connections (e.g., 1370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C #, JAVA, Perl, JAVASCRIPT, PYTHON, Ruby, ABAP, SQL, XCODE, GO, ADOBE FLASH, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more processing units coupled to the memory; and
   one or more computer readable storage media storing instructions that, when loaded into the memory and executed by the one or more processing units, cause the computing system to perform operations comprising:
      receiving first sensor data from at least a first sensor, the at least a first sensor being part of a first TOT device and being a hardware sensor configured to detect information regarding a first physical surrounding of the first TOT device or regarding use of the first TOT device in the first physical surrounding;

receiving at least second sensor data from at least a second sensor, the at least a second sensor being part of at least a second TOT device and being a hardware sensor configured to detect information regarding a second physical surrounding of the at least a second TOT device or regarding use of the at least a second TOT device in the second physical surrounding;
associating the first sensor data with a first category;
associating the at least second sensor data with a second category;
retrieving at least a first schedule data object associated with the first category;
retrieving at least a second schedule data object associated with the second category;
determining at least a first activity specified by the at least a first schedule data object, wherein the at least a first activity comprises at least a first condition defined at least in part with respect to at least one of the at least a first sensor and the at least a second sensor;
determining a status associated with the at least a first condition;
rendering a first display, the rendering comprising:
determining a first time;
determining a first time period specified by the at least a first schedule data object;
determining that the first time period is associated with the first time;
rendering for display a first selectable icon associated with the first category, wherein the rendering for display the first selectable icon is carried out at least in part in response to the determining that the first time period is associated with the first time;
rendering for display a second selectable icon associated with the second category, wherein the second selectable icon is different than the first selectable icon; and
rendering for display an indication of the status of the at least a first condition;
determining at least a second activity specified by the at least a first schedule data object, wherein the at least a second activity comprises at least a second condition defined at least in part with respect to at least one of the at least a first sensor and the at least a second sensor;
rendering a second display, the second display not being identical to the first display, the rendering the second display comprising:
determining a second time, the second time being different than the first time;
determining that the first time period is not associated with the second time;
removing from the first display the indication of the status of the at least a first condition, wherein the removing from the first display the indication of the status of the at least a first condition is carried out at least in part in response to the determining that the first time period is not associated with the second time;
determining a second time period specified by the first schedule data object, the second time period being different than the first time period;
determining that the second time period is associated with the second time; and
rendering for display an indication of the status of the at least a second condition, wherein the rendering for display the indication of the status of the at least a second condition is carried out at least in part in response to the determining that the second time period is associated with the second time.

2. The computing system of claim 1, wherein the status is associated with a location, the rendering further comprising displaying a map and a status identifier displayed on the map by the location.

3. The computing system of claim 1, the operations further comprising:
determining at least one activity of the at least a second schedule data object, wherein the at least one activity of the at least a second schedule data object includes a condition defined at least in part with respect to at least one of the at least a first sensor and the at least a second sensor; and
determining a status associated with the condition of the at least a second schedule data object;
wherein the rendering the first display comprises:
determining that the second time period is not associated with the first time, wherein the indication of the status of the at least a second schedule data object is not rendered at the first time.

4. The computing system of claim 1, wherein the at least a first condition is associated with at least one action that is automatically triggered when the at least a first condition is met, the operations further comprising:
determining that the at least a first condition is met; and
triggering the at least a one action.

5. The computing system of claim 1, wherein the at least a first schedule data object is associated with a sequence, the sequence relating the at least a first activity to the at least a second activity of the at least a first schedule data object.

6. The computing system of claim 5, wherein the sequence is associated with at least one trigger, wherein if a condition associated with the at least one trigger is met, a status of the at least a second activity is updated.

7. The computing system of claim 6, wherein updating the status of the at least a second activity comprises causing the at least a second activity to be rendered for display.

8. The computing system of claim 5, wherein updating the status of the at least a second activity comprises causing a status indicator associated with the at least a second activity to be updated on the second display.

9. The computing system of claim 1, the rendering the first display or the rendering the second display further comprising rendering for display an indication of a status associated with the at least a second schedule data object.

10. The computing system of claim 1, the rendering the first display or the rendering the second display further comprising:
rendering a map;
obtaining geographical information system data, the geographical information system data comprising real-time traffic data; and
displaying the real-time traffic data on the map.

11. The computing system of claim 1, the rendering the first display or the rendering the second display further comprising:
receiving still or video images from a camera associated with the at least a first sensor; and
rendering for display the still or video images.

12. The computing system of claim 1, the rendering the first display further comprising:

issuing a first predetermined query to at least a first database, having a first database schema, the first predetermined query specified by the at least a first schedule data object; and receiving query execution results in response to the first predetermined query;

wherein the rendering for the display an indication of the status of the at least a first condition comprises rendering for display at least a portion of the received query execution results.

13. The computing system of claim 12, wherein the at least a first schedule data object comprises at least a first calculation, the at least a first calculation based at least in part on at least a portion of the received query execution results and the rendering the first display further comprises:

executing the at least a first calculation to provide at least a first calculation result; and rendering for display the at least a first calculation result.

14. The computing system of claim 1, wherein the first time is a first current time.

15. The computing system of claim 14, wherein the second time is a second current time, the second current time being after the first current time.

16. One or more non-transitory computer-readable storage media comprising:

computer-executable instructions that, when executed, cause a computing device to receive first sensor data from at least a first sensor, the at least a first sensor being part of a first TOT device and being a hardware sensor configured to detect information regarding a first physical surrounding of the first TOT device or regarding use of the first TOT device in the first physical surrounding;

computer-executable instructions that, when executed, cause the computing device to receive at least second sensor data from at least a second sensor, the at least a second sensor being part of at least a second TOT device and being a hardware sensor configured to detect information regarding a second physical surrounding of the at least a second TOT device or regarding use of the at least a second TOT device in the second physical surrounding;

computer-executable instructions that, when executed, cause the computing device to associate the first sensor data with a first category;

computer-executable instructions that, when executed, cause the computing device to associate the at least second sensor data with a second category;

computer-executable instructions that, when executed, cause the computing device to retrieve at least a first schedule data object associated with the first category;

computer-executable instructions that, when executed, cause the computing device to retrieve at least a second schedule data object associated with the second category;

computer-executable instructions that, when executed, cause the computing device to determine at least a first activity specified by the at least a first schedule data object, wherein the at least a first activity comprises at least a first condition defined at least in part with respect to at least one of the at least a first sensor and the at least a second sensor;

computer-executable instructions that, when executed, cause the computing device to determine a status associated with the at least a first condition;

computer-executable instructions that, when executed, cause the computing device to render a first display, the rendering comprising:

determining a first time;

determining a first time period specified by the at least a first schedule data object;

determining that the first time period is associated with the first time;

rendering for display a first selectable icon associated with the first category, wherein the rendering for display the first selectable icon is carried out at least in part in response to the determining that the first time period is associated with the first time;

rendering for display a second selectable icon associated with the second category, wherein the first selectable icon is different than the second selectable icon; and rendering for display an indication of the status of the at least a first condition;

computer-executable instructions that, when executed, cause the computing device to determine at least a second activity specified by the at least a first schedule data object, wherein the at least a second activity comprises at least a second condition defined at least in part with respect to at least one of the at least a first sensor and the at least a second sensor;

computer-executable instructions that, when executed, cause the computing device to render a second display, the second display not being identical to the first display, the rendering the second display comprising:

determining a second time, the second time being different than the first time;

determining that the first time period is not associated with the second time;

removing from the first display the indication of the status of the at least a first condition, wherein the removing from the first display the indication of the status of the at least a first condition is carried out at least in part in response to the determining that the first time period is not associated with the second time;

determining a second time period specified by the first schedule data object, the second time period being different than the first time period;

determining that the second time period is associated with the second time; and rendering for display an indication of the status of the at least a second condition, wherein the rendering for display the indication of the status of the at least a second condition is carried out at least in part in response to the determining that the second time period is associated with the second time.

17. The one or more non-transitory computer-readable storage media of claim 16, wherein the at least a first condition is associated with at least one action that is automatically triggered when the at least a first condition is met, further comprising:

computer-executable instructions that, when executed, cause the computing device to determine that the at least a first condition is met; and computer-executable instructions that, when executed, cause the computing device to trigger the at least one action.

18. A method, implemented in a computing system comprising a memory and one or more processors, comprising:

receiving first sensor data from at least a first sensor, the at least a first sensor being part of a first TOT device and being a hardware sensor configured to detect information regarding a first physical surrounding of the first TOT device or regarding use of the first TOT device in the first physical surrounding;

receiving at least second sensor data from at least a second sensor, the at least a second sensor being part of at least a second TOT device and being a hardware sensor configured to detect information regarding a second physical surrounding of the at least a second TOT device or regarding use of the at least a second TOT device in the second physical surrounding;

associating the first sensor data with a first category;

associating the at least second sensor data with a second category;

retrieving at least a first schedule data object associated with the first category;

retrieving at least a second schedule data object associated with the second category;

determining at least a first activity specified by the at least a first schedule data object, wherein the at least a first activity comprises at least a first condition defined at least in part with respect to at least one of the at least a first sensor and the at least a second sensor;

determining a status associated with the at least a first condition;

rendering a first display, the rendering comprising:
   determining a first time;
   determining a first time period specified by the at least a first schedule data object;
   determining that the first time period is associated with the first time;
   rendering for display a first selectable icon associated with the first category, wherein the rendering for display the first selectable icon is carried out at least in part in response to the determining that the first time period is associated with the first time;
   rendering for display a second selectable icon associated with the second category, wherein the second selectable icon is different than the first selectable icon; and
   rendering for display an indication of the status of the at least a first condition;

determining at least a second activity specified by the at least a first schedule data object, wherein the at least a second activity comprises at least a second condition defined at least in part with respect to at least one of the at least a first sensor and the at least a second sensor;

rendering a second display, the second display not being identical to the first display, the rendering the second display comprising:
   determining a second time, the second time being different than the first time;
   determining that the first time period is not associated with the second time;
   removing from the first display the indication of the status of the at least a first condition, wherein the removing from the first display the indication of the status of the at least a first condition is carried out at least in part in response to the determining that the first time period is not associated with the second time;
   determining a second time period specified by the first schedule data object, the second time period being different than the first time period;
   determining that the second time period is associated with the second time; and
   rendering for display an indication of the status of the at least a second condition, wherein the rendering for display the indication of the status of the at least a second condition is carried out at least in part in response to the determining that the second time period is associated with the second time.

19. The method of claim 18, wherein the at least a first condition is associated with at least one action that is automatically triggered when the at least a first condition is met, the method further comprising:
   determining that the at least a first condition is met; and
   triggering the at least one action.

20. The method of claim 18, the rendering the first display further comprising:
   issuing a first predetermined query to at least a first database, having a first database schema, the first predetermined query specified by the at least a first schedule data object; and
   receiving query execution results in response to the first predetermined query;
   wherein the rendering for the display an indication of the status of the at least a first condition comprises rendering for display at least a portion of the received query execution results.

* * * * *